(12) United States Patent
　　　Raichelgauz

(10) Patent No.:　US 12,697,996 B2
(45) Date of Patent:　　　Aug. 4, 2026

(54) PERCEPTION AND PREDICTION BASED DRIVING

(71) Applicant: AUTOBRAINS TECHNOLOGIES LTD, Tel Aviv-Jaffa (IL)

(72) Inventor: Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 312 days.

(21) Appl. No.: 18/459,416

(22) Filed: Aug. 31, 2023

(65) Prior Publication Data

US 2023/0406347 A1　　Dec. 21, 2023

Related U.S. Application Data

(63) Continuation-in-part of application No. 18/036,150, filed as application No. PCT/IB2021/053181 on Apr. 17, 2021.

(51) Int. Cl.
　　　B60W 60/00　　　　(2020.01)
(52) U.S. Cl.
　　　CPC ... B60W 60/001 (2020.02); B60W 2510/0638 (2013.01); B60W 2554/4044 (2020.02)
(58) Field of Classification Search
　　　CPC ....... B60W 60/001; B60W 2554/4044; B60W 50/0097; G06N 3/006; G06N 3/045; G06N 3/0464; G06N 3/08; G06N 20/00; G06V 10/762; G06V 10/764; G06V 10/82; G06V 20/56
See application file for complete search history.

(56) References Cited

U.S. PATENT DOCUMENTS

2019/0079659 A1*　3/2019　Adenwala ................ G08G 1/22
2019/0303759 A1*　10/2019　Farabet .................. G06N 3/045
2022/0353732 A1*　11/2022　Filippou ........... H04W 28/0289

* cited by examiner

*Primary Examiner* — Toya Pettiegrew
(74) *Attorney, Agent, or Firm* — RECHES PATENTS

(57)　　　　ABSTRACT

A method for managing a group of narrow artificial intelligence (AI) agents for at least partially autonomous driving, the method includes (i) obtaining, by a prediction circuit, a stream of metadata segments generated at multiple points in time and associated with a selection of one or more subgroups of the group of narrow AI agents; wherein the metadata segments are selected out of (a) selected narrow AI agent identifiers, and (b) multiple multi-domain identifier, the multiple multi-domain identifier are indicative of multiple instances of multi-domain information about elements affecting a vehicle in relation to the multiple points in time; wherein a multi-domain identifier generated at a given point of time of the multiple points in time is a combination of class signatures that are indicative of classes of elements of a multi-domain information associated with the given point in time; (ii) finding, by the prediction circuit, a segment of the stream that is a predictor to a receiving of a next cluster identifier at a future point in time; and (iii) automatically predicting, when finding the predictor, at least one of: (c) future metadata segments to be received during the future point of time, or (d) a future sub-group of narrow AI agents to be selected at the future point of time.

20 Claims, 18 Drawing Sheets

Ensemble 40 of Narrow AI agents

Image (pixels) 8

Perception router 30

Coordinator 50

Actuation 60

Image
(pixels)
8

Perception
router  30

Ensemble 40 of
Narrow AI agents

Corrdinator
50

Actuation
60

10

10'

300

310

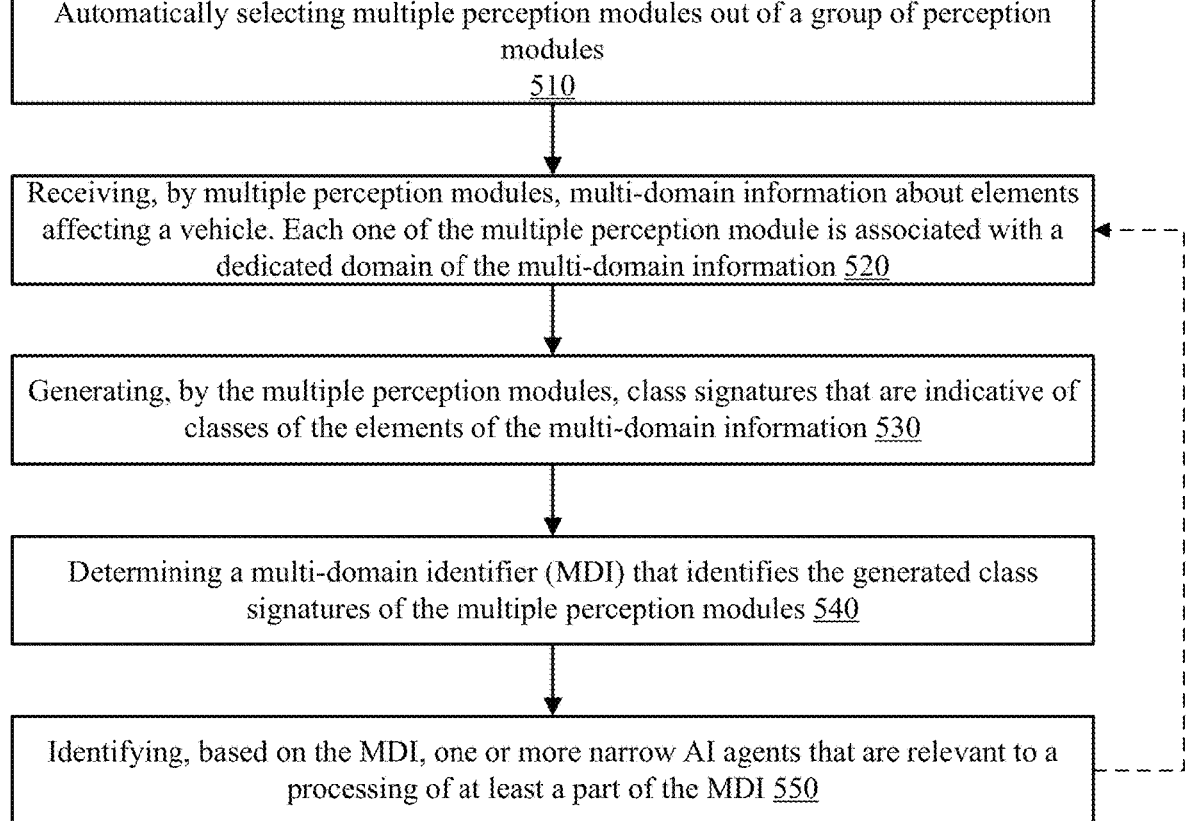

Automatically selecting multiple perception modules out of a group of perception
modules
510

Receiving, by multiple perception modules, multi-domain information about elements
affecting a vehicle. Each one of the multiple perception module is associated with a
dedicated domain of the multi-domain information 520

Generating, by the multiple perception modules, class signatures that are indicative of
classes of the elements of the multi-domain information 530

Determining a multi-domain identifier (MDI) that identifies the generated class
signatures of the multiple perception modules 540

Identifying, based on the MDI, one or more narrow AI agents that are relevant to a
processing of at least a part of the MDI 550

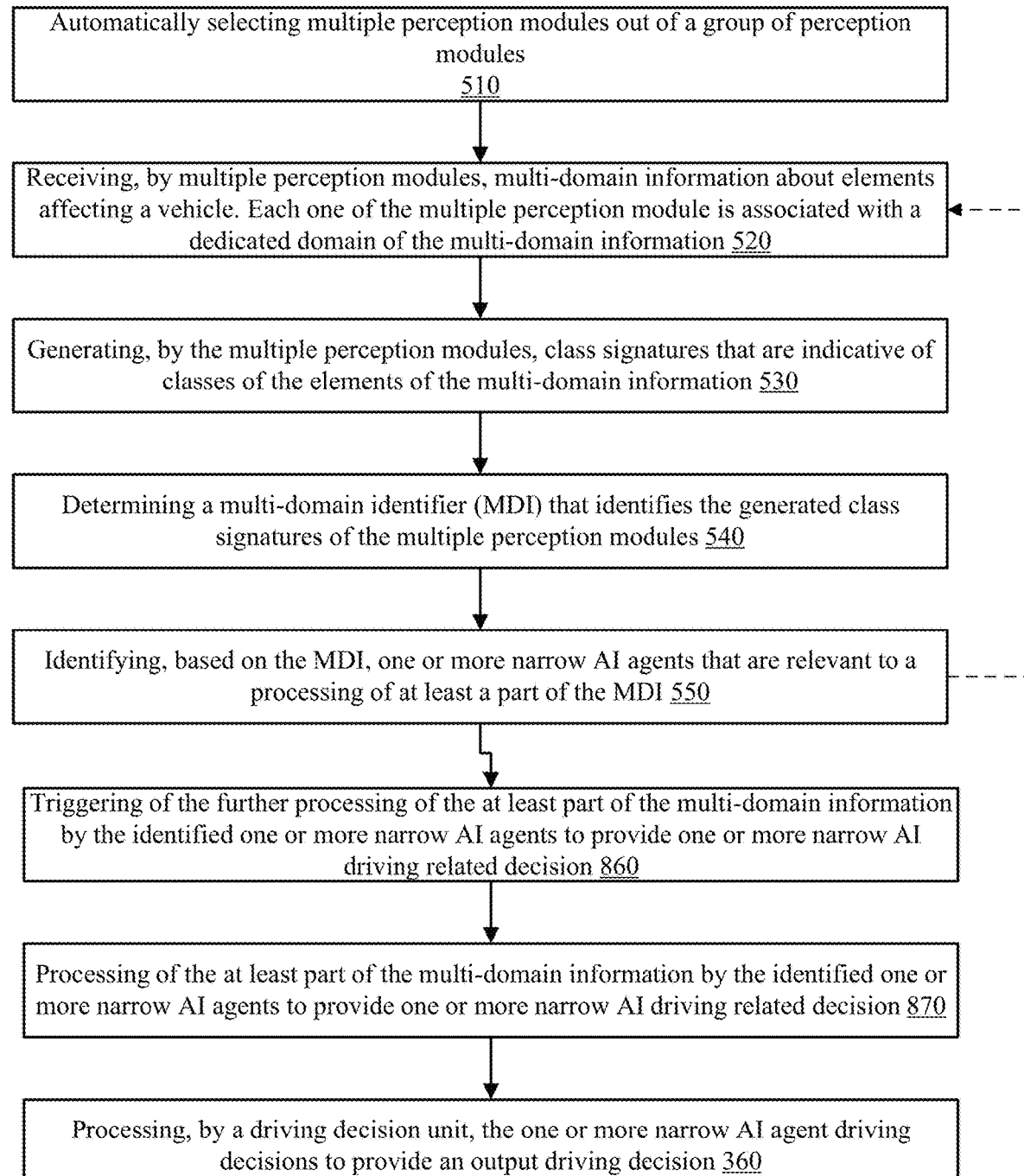

Automatically selecting multiple perception modules out of a group of perception modules
510

Receiving, by multiple perception modules, multi-domain information about elements affecting a vehicle. Each one of the multiple perception module is associated with a dedicated domain of the multi-domain information 520

Generating, by the multiple perception modules, class signatures that are indicative of classes of the elements of the multi-domain information 530

Determining a multi-domain identifier (MDI) that identifies the generated class signatures of the multiple perception modules 540

Identifying, based on the MDI, one or more narrow AI agents that are relevant to a processing of at least a part of the MDI 550

Triggering of the further processing of the at least part of the multi-domain information by the identified one or more narrow AI agents to provide one or more narrow AI driving related decision 860

Processing of the at least part of the multi-domain information by the identified one or more narrow AI agents to provide one or more narrow AI driving related decision 870

Processing, by a driving decision unit, the one or more narrow AI agent driving decisions to provide an output driving decision 360

Figure 5F:
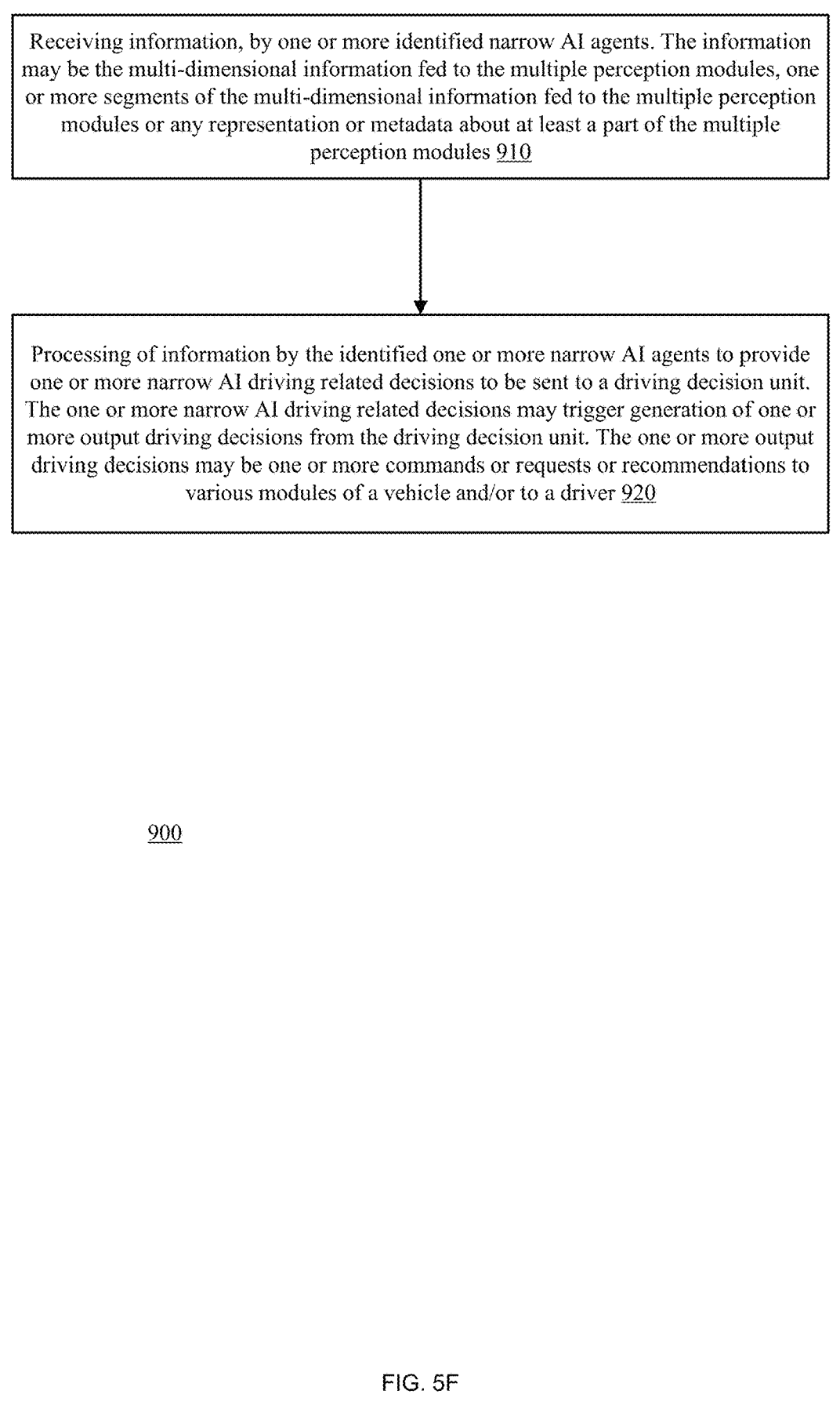

Receiving information, by one or more identified narrow AI agents. The information may be the multi-dimensional information fed to the multiple perception modules, one or more segments of the multi-dimensional information fed to the multiple perception modules or any representation or metadata about at least a part of the multiple perception modules 910

Processing of information by the identified one or more narrow AI agents to provide one or more narrow AI driving related decisions to be sent to a driving decision unit. The one or more narrow AI driving related decisions may trigger generation of one or more output driving decisions from the driving decision unit. The one or more output driving decisions may be one or more commands or requests or recommendations to various modules of a vehicle and/or to a driver 920

Figure 5G:
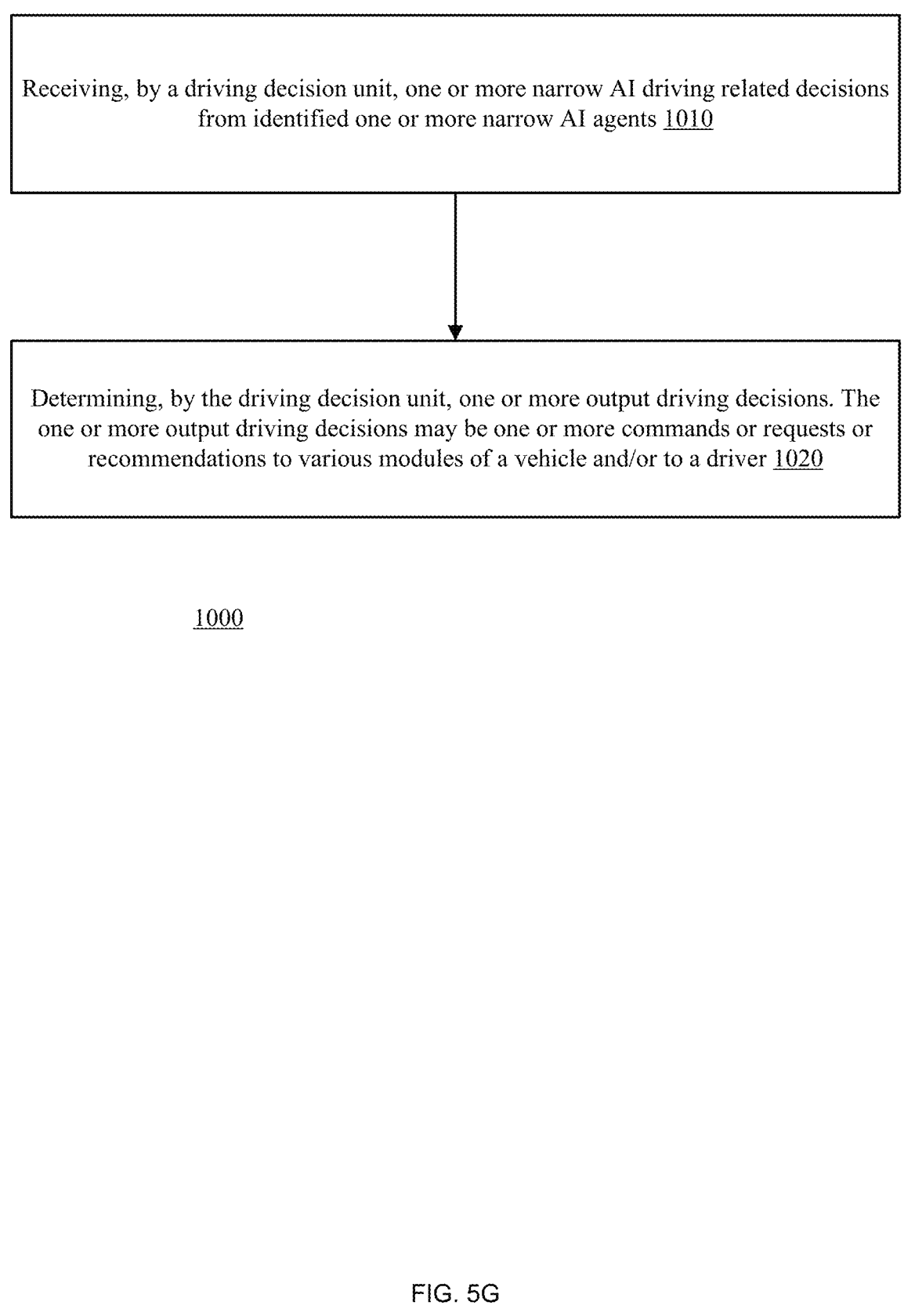

Receiving, by a driving decision unit, one or more narrow AI driving related decisions from identified one or more narrow AI agents 1010

Determining, by the driving decision unit, one or more output driving decisions. The one or more output driving decisions may be one or more commands or requests or recommendations to various modules of a vehicle and/or to a driver 1020

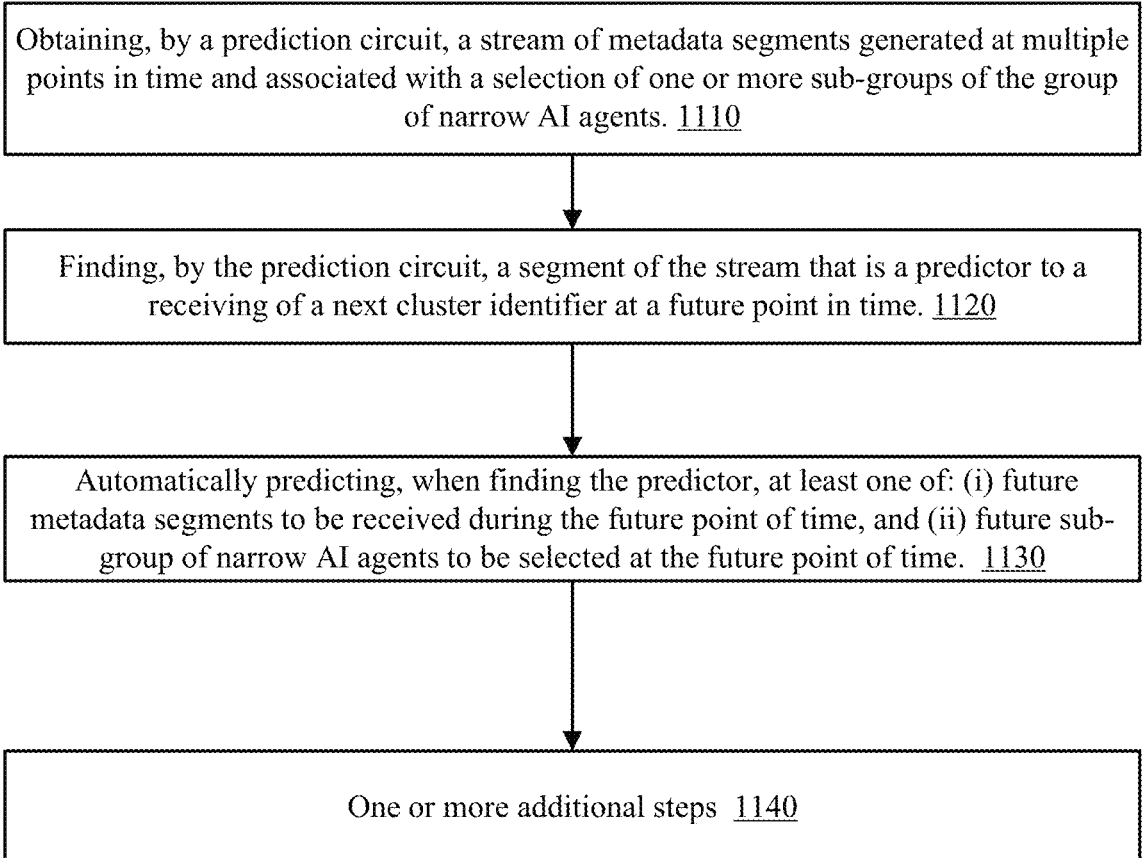

Obtaining, by a prediction circuit, a stream of metadata segments generated at multiple points in time and associated with a selection of one or more sub-groups of the group of narrow AI agents. 1110

Finding, by the prediction circuit, a segment of the stream that is a predictor to a receiving of a next cluster identifier at a future point in time. 1120

Automatically predicting, when finding the predictor, at least one of: (i) future metadata segments to be received during the future point of time, and (ii) future sub-group of narrow AI agents to be selected at the future point of time. 1130

One or more additional steps 1140

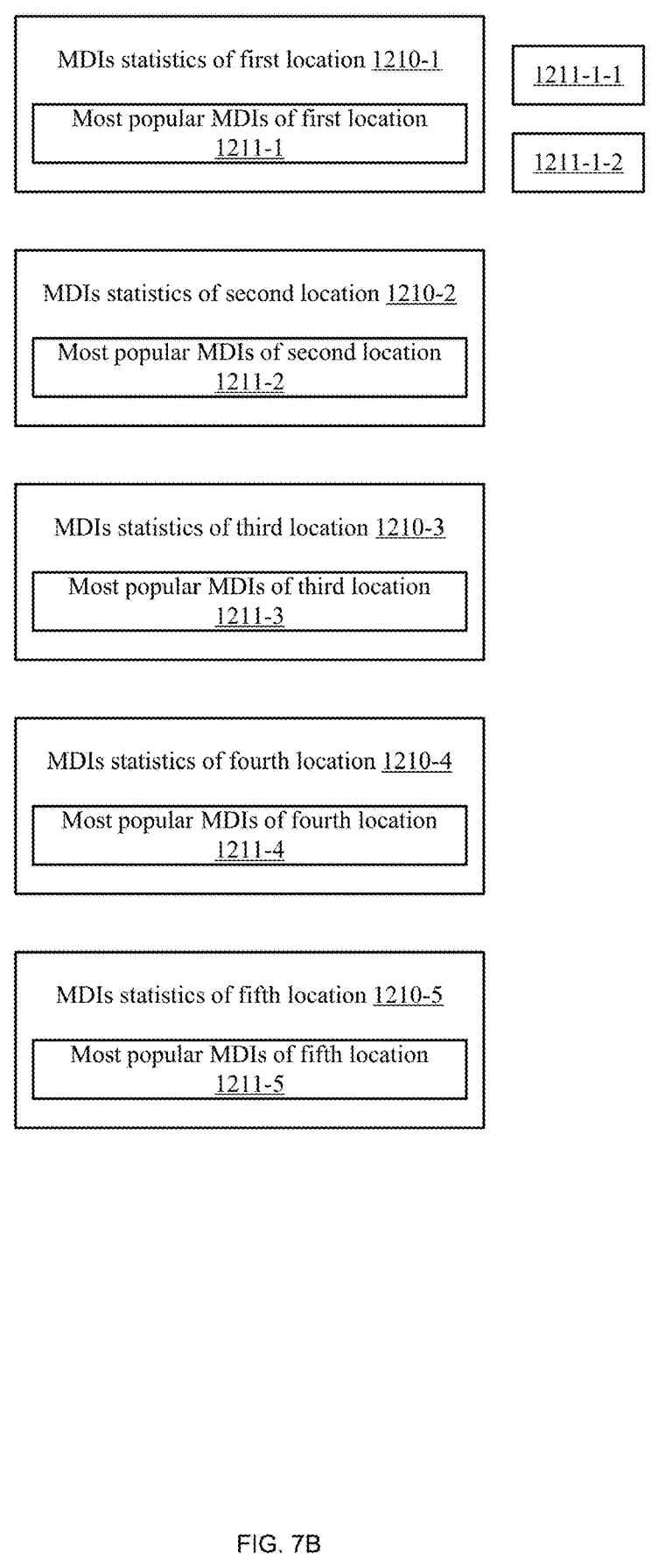

MDIs statistics of first location 1210-1

Most popular MDIs of first location
1211-1

1211-1-1

1211-1-2

MDIs statistics of second location 1210-2

Most popular MDIs of second location
1211-2

MDIs statistics of third location 1210-3

Most popular MDIs of third location
1211-3

MDIs statistics of fourth location 1210-4

Most popular MDIs of fourth location
1211-4

MDIs statistics of fifth location 1210-5

Most popular MDIs of fifth location
1211-5

FIG. 7B

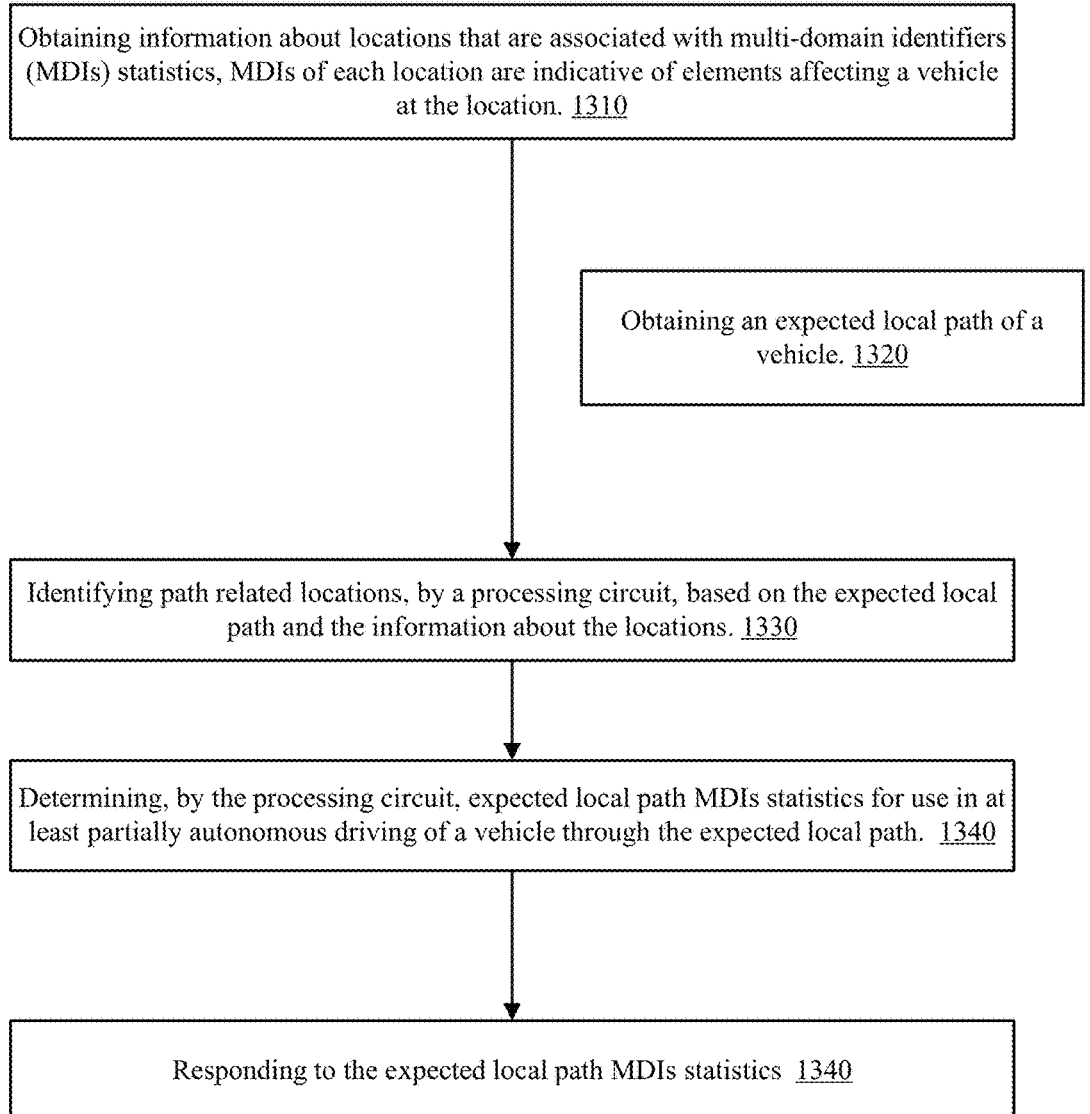

Obtaining information about locations that are associated with multi-domain identifiers (MDIs) statistics, MDIs of each location are indicative of elements affecting a vehicle at the location. 1310

Obtaining an expected local path of a vehicle. 1320

Identifying path related locations, by a processing circuit, based on the expected local path and the information about the locations. 1330

Determining, by the processing circuit, expected local path MDIs statistics for use in at least partially autonomous driving of a vehicle through the expected local path. 1340

Responding to the expected local path MDIs statistics 1340

PERCEPTION AND PREDICTION BASED DRIVING

BACKGROUND

Autonomous vehicles include a perception systems that performs semantic decomposition (SD). There, the AV flow is composed of the three modules: perception module that feeds its output to route planning module that feeds its output to actuation module (brake/accel/steering etc.).

Because route planning and actuation modules do not have access to raw sensor input, the role of perception in the SD architecture is to exhaustively label the raw inputs from the car's sensors, e.g. detect cars and pedestrians, segment free drivable space, recognize speed limit through road signs, and everything else in the scene that could possibly affect driving in this scene. Since so many objects/entities need to be identified and accurately localized within the scene, SD perception module tends to be a complicated computationally-intensive model.

BRIEF DESCRIPTION OF THE DRAWINGS

The embodiments of the disclosure will be understood and appreciated more fully from the following detailed description, taken in conjunction with the drawings in which:

FIG. 5A illustrates an example of a method;

FIG. 5E illustrates an example of an image;

FIG. 5F illustrates an example of an image;

FIG. 5G illustrates an example of an image;

FIG. 6A illustrates an example of an image;

FIG. 7B illustrates an example of a MDI statistics;

FIG. 7C illustrates an example of a method; and

DESCRIPTION OF EXAMPLE EMBODIMENTS

Figure 1:
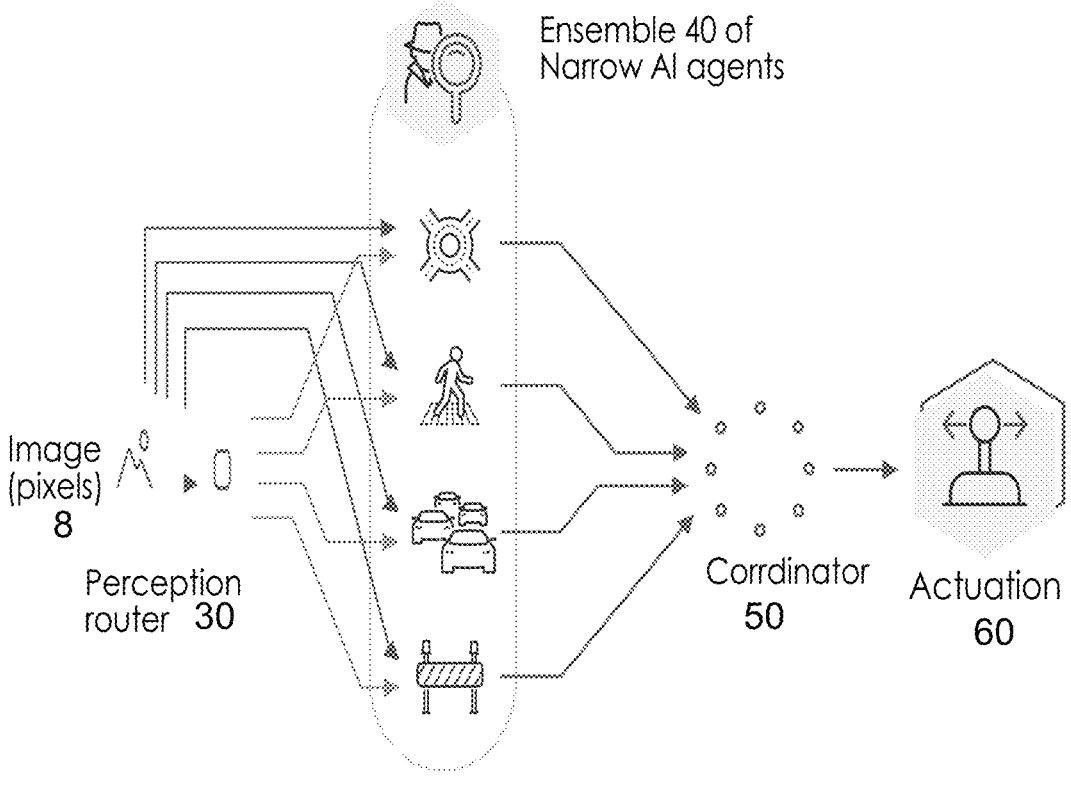
FIG. 1 illustrates an example of a system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the perception unit, narrow AI agents, driving decision unit may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors—such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a spanning element. A spanning element may be implemented in software or hardware. Different spanning element of a certain iteration are configured to apply different mathematical functions on the input they receive. Non-limiting examples of the mathematical functions include filtering, although other functions may be applied.

The specification and/or drawings may refer to a concept structure. A concept structure may include one or more clusters. Each cluster may include signatures and related metadata. Each reference to one or more clusters may be applicable to a reference to a concept structure.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

A situation nay be a singular location/combination of properties at a point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

A perception unit may be provided and may be preceded by the one or more sensors and/or by one or more interfaces form receiving one or more sensed information units. The perception unit may be configured to receive a sensed information unit from an I/O interface and/or from a sensor. The perception unit may be followed by multiple narrow AI agents—also referred to an ensemble of narrow AI agents.

An artificial intelligence (AI) agent may refer to an autonomous entity which acts, directing its activity towards achieving goals (i.e. it is an agent), upon an environment using observation through sensors and consequent actuators (i.e. it is intelligent). Intelligent agents may also learn or use knowledge to achieve their goals. They may be very simple or very complex. A reflex machine, such as a thermostat, is considered an example of an intelligent agent (www.wikipedia.org).

A sensed information unit may or may not be processed before reaching the perception unit. Any processing may be providing—filtering, noise reduction, and the like.

The number of narrow AI agents may, for example—exceed 100, exceed 500, exceed 1000, exceed 10,000, exceed 100,000 and the like. Larger number of narrow AI agents may provide more accurate driving decisions.

An AI narrow agent is narrow in the sense that it is not trained to respond to all possible (or all probable, or a majority of) scenarios that should be dealt by the entire ensemble. For example—each AI narrow agent may be trained to respond to a fraction (for example less than 1 percent) of the scenarios managed by the entire ensemble. A narrow AI agent may be trained to respond to only some factors or elements or parameters or variables that form a scenario.

The narrow AI agents may be of the same complexity and/or of same parameters (depth, energy consumption, technology implementation)—but at least some of the narrow AI agents may differ from each other by at least one of complexity and/or parameters.

The narrow AI agents may be trained in a supervised manner and/or non-supervised manner.

One or more narrow AI agents may be a neural network or may differ from a neural network.

The ensemble may include one or more sensors and any other entity for generating a sensed information unit and/or may receive (by an interface) one or more sensed information units from the one or more sensors.

The perception unit may process the one or more sensed information units and determine which narrow AI agents are relevant to the processing of the one or more sensed information units.

There may be provided an autonomous vehicle system that may use the perception unit to classify the observed scene into multiple coarse grained categories. The system may include an ensemble of narrow AI agents (EoN).

The perception unit may receive and/or generate anchors that once detected (by the perception unit), may affect the selection of which narrow AI agents to select. The number of anchors may be very big (for example—above 100, 500, 1000, 10,000, 20,000, 100,000 anchors and even more).

For a given scenario (may be represented by one or more sensed information units such as but not limited to one or more images), the perception unit may detect one or more anchors.

The detected anchors may provide sufficient contextual cues to allow the perception unit to determine which are the relevant narrow AI agents.

The contextual cue may be a high-level sensed information unit context. It is high level in the sense that the determining of the contextual cue is less complex and/or requires less computational resources than performing object detection of a small object in a sensed information unit. A small object may be of a minimal size to be detected, may be, for example of a size of a few tens of pixels, may be of a size that is smaller than 0.1, 0.5, 1, 2, 3 percent of the sensed information unit, and the like. The determining of the contextual cue may not, for example, include determining the exact locations of each object in the image—including the locations of objects that appear as few tens of pixels in an image.

By searching for high-level sensed information unit context, the power consumption of the perception unit may be much lower (for example even up to two orders of magnitude lower) than the power consumption of a prior art system that is built to perform the entire process of object detection, and determining which driving operation to perform).

At least some of the power savings can be attributed to the fact the high-level sensed information unit context may not include location information, there is no need to determined whether objects of different sizes are the same type of objects, and the like.

A narrow AI agent may receive input directly from the sensors (for example—as an output of the perception module) and provides as an output a proposed behavior (desired vehicle control parameter—and desired vehicle behavior—also referred to as driving decisions), e.g. angle of a steering wheel, acceleration/brake signal, or control of any other aspect of driving, etc.

The outputs from the different selected narrow AI agents are fed to a driving decision unit (also referred to as coordinator) that outputs an one or more output driving decisions such as one or more commands or requests or recommendations to various modules of a vehicle and/or to a driver.

The coordinator may apply any method for generating one or more output driving decisions such as the one or more commands and requests based on the outputs from the different selected narrow AI agents.

These methods may include arbitration, competition, selecting a response based on a risk imposed by adopting an output of a narrow AI agent, and the like.

Referring back to the perception unit—non-limiting examples of anchors are listed below:

approaching pedestrian crossing. Detecting a pedestrian on a sidewalk triggers different behavior depending on the proximity of a crossing. If the pedestrian is standing on the sidewalk next to a crossing then the car should slow down (in case the pedestrian will start crossing). Same pedestrian on a sidewalk can be safely ignored in other areas. Therefore, different narrow agents may be needed to drive through a pedestrian crossing.

Approaching a pothole on a road. This can trigger slow-down of a car or changing lanes Limited visibility and slipper road condition—can pre-scribe slower speed and/or larger safe distance from the car in front.

Encoded navigation signal—when crossing a junction, the narrow agent should get a signal if we are crossing this junction straight through, turning left, or right. This anchor/signal will change the meaning of what it means to "stay in lane".

Changing lanes—this anchor triggers a particular narrow agent responsible for changing the lane to the left or right.

Approaching road merging with different traffic signs—do I give a right of way or do I have a priority?

Presence of an unsafe driver in the vicinity: tailgating, erratic driving, cues of road rage can trigger changing to the rightmost lane, slowing down, and letting the dangerous car pass.

A police car follows you with emergency lights flashing: switch to the rightmost lane, then stop at a shoulder.

Car in from makes an emergency stop: activates a narrow agent that either performs emergency braking or turn-ing to a shoulder and stopping there with lower decel-eration.

The anchors may be selected, generated and/or learnt in various manners-manually, automatically, based on human tagging of inputs, based on autonomous tagging of inputs, based on manually identification, based on tagging of sce-narios (e.g., approaching a roundabout, approaching a pedestrian crossing, environmental condition, existence of a road user)—in this case the corresponding desired behavior can be devised from the recorded behavior of the human driver in this situation, identifying unfamiliar or poorly predicted patterns of human driving. These patterns may suggest a world state that is not well covered by existing narrow agents therefore renders allocation of the new agent.

A narrow AI agent may be or may include a simple model (for example—a neural network) that receives raw (or pre-processed in any manner) sensor data as its input, processes it internally, and outputs a proposed behavior.

Examples of narrow AI agents are listed below:

Narrow AI agent for "stay in lane" steering behavior when not at a junction. The narrow AI agent may be a Convolutional Neural Network that maps image of the road taken by a front-facing camera to the steering angle of a vehicle.

Narrow AI agent for "stay in lane" steering behavior at a left-turn junction. Note that at a junction, "staying in lane" has a different meaning if we drive straight or turn left. The narrow agent for the left receives images from the frontal and left looking cameras and maps it into a steering angle. Depending on the definition, the infor-mation that indicates that an agent is turning left rather than driving straight through is either received as an input from the navigation block or is encoded as an "anchor". This narrow AI agent may be implemented as a CNN.

Narrow AI agent that implements the behavior of "change to the lane on the left". This narrow AI agent gets access to left-facing camera and proposes actions required to change lane, i.e., decision to when to change lane, acceleration before and during the change, and steering that implements changing the lane.

Narrow AI agent that steers when a vehicle is stopped at a red traffic light. This narrow AI agent is implemented as "if" condition and just keeps the steering angle constant.

Narrow AI agent that implements "keep the distance" logic: this narrow AI agent maps images taken from the frontal facing and backward facing cameras on to accelerate/brake signal.

Narrow AI agent that implements "give right way on pedestrian crossing"—this narrow AI agent stops if there is a pedestrian on a crossing or slows down if the pedestrian is near but not on the crossing. Uses input from the frontal facing camera and maps it onto brake/accelerate signal.

Examples of how the coordinator may process outputs from one or more narrow AI agents:

Combine independently.

Narrow AI agent responsible for steering angle that allows the car to stay in lane is mostly independent of driving speed. Thus, this agents proposed behavior can be combined independently with accelerate/brake behav-ior of the "keep the distance" narrow agent.

Override.

The vehicle should stay in lane but the car in front of us suddenly stopped and there is not enough braking distance to stop. Here, the desire to avoid a crush overrides the "stay in lane" behavior and we turn onto a shoulder and stop there.

Animal on the road—abandoning "stay in lane" and perform evasion maneuver.

"Modulate"

Slippery road will leave the "stay in lane" and "keep distance" behavior almost unchanged although will prescribe slower speeds and larger safe distances.

perform a risk reduction optimization.

The system is expected to be superior to the SD systems in all aspects, whether it is behavioral accuracy, model size and complexity, and computational intensity.

The perception unit may work in a more efficient manner than state of the art perception systems. State of the art perception systems analyze the scene fully, with the goal to reconstruct the scene, i.e. the focus on all details of the scene such as—the exact analysis of all agent on the road (pedes-trian, car, bike, lanes, traffic signs, traffic lights, trees, obstacles etc.) and their attributes (exact location, pose, distance, angle, etc.). This is very power and resources consuming process—as its purpose is to generate an exten-sive environmental model as an input to the policy module.

A perception unit does not need to concentrate on all the details, and identify every agent—it only needs to analyze and classify the scene only in order to activate the relevant agent. This is a very light process performance-wise. The relevant agent, once activated, will analyze the relevant features of the input image.

It should be noted that even when the number of narrow AI agents is large—some may be stored in RAM and others may be saved in non-volatile memory (for example in disks, in cheap non-volatile memory, and the like)—and can be retrieved when needed.

The perception module may be very fast as it tasks is to detect anchors and based on the anchors—selecting the relevant narrow AI agents. Each narrow AI agent may also very fast, however, we have a very large number of these. Lucky, at any given point only few of them need to actually run, i.e., at any given point of time the running time is very small.

The suggested units may be executed or hosted by a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

FIG. 1 illustrates an example of a system 10.

System 10 includes a perception unit such as perception router 30 (that receives a sensed information unit that is an image 8 with pixels), an ensemble 40 narrow AI agents (for example narrow AI agents associated with a roundabout, with a pedestrian that walks over a zebra crossing, with a certain traffic sign, or with a traffic jam), and a driving decision unit such as coordinator 50. The driving decision unit 50 may control and/or may communicate with a response unit 60.

Figure 2:
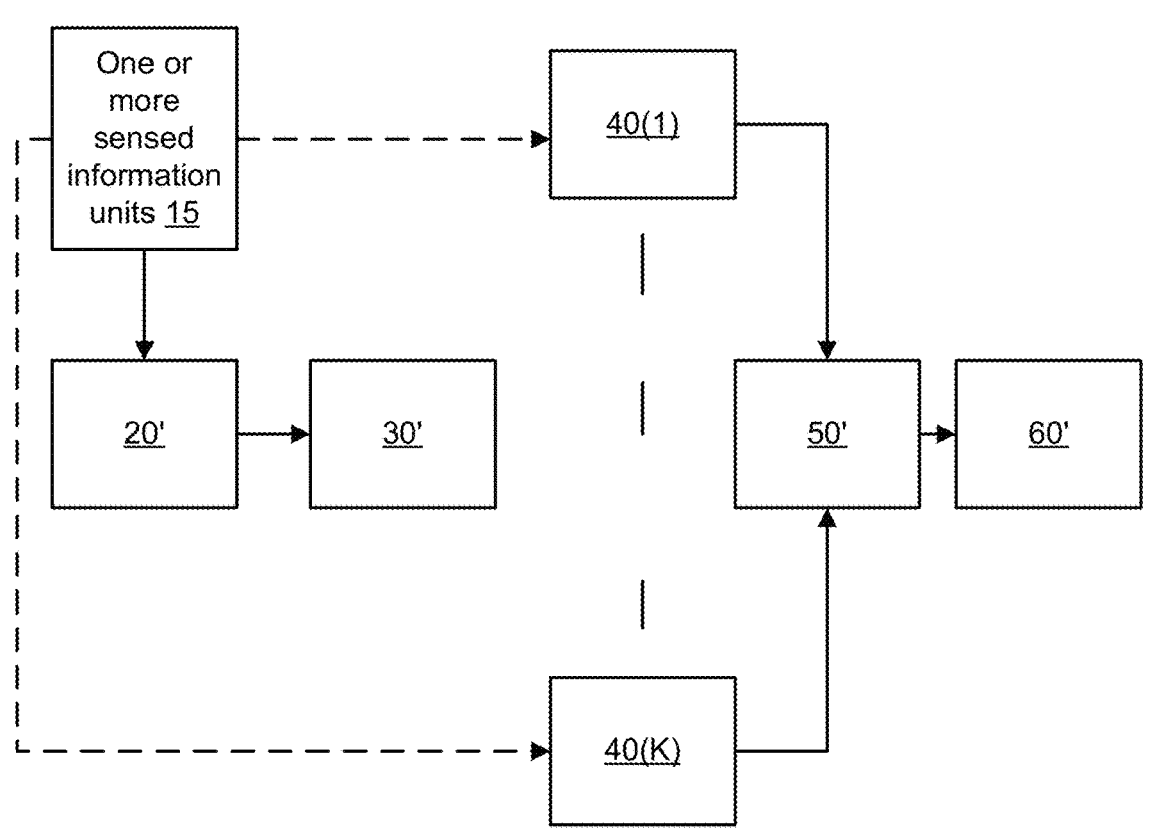
FIG. 2 illustrates an example of a system.

FIG. 2 illustrates an example of a system 10'.

System 10' includes an obtaining unit 20' (for receiving one or more sensed information units 15), a perception unit 30', narrow AI agents 40(1)-40(K), K being the number of narrow AI agents, and driving decision unit 50'. The driving decision unit may control and/or may communicate with a response unit 60' such as a brakes control system, any vehicle computer, an autonomous driving module, an ADAS driving module, and the like.

Figure 3:
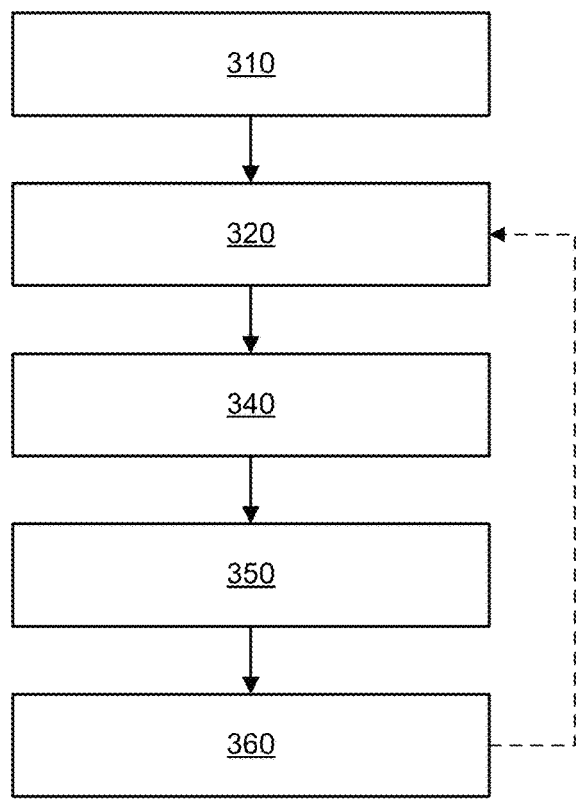
FIG. 3 illustrates an example of a method.

FIG. 3 illustrates method 300 for operating an ensemble of narrow AI agents related to a vehicle.

Related to a vehicle means that the output of method 300 may be one or more driving decisions that may affect the driving of the vehicle when implemented.

The method may include various steps, some may include providing desired driving decisions (for example during a training of any part of the entities used during method 300, the entities may include a perception unit, narrow AI agents, and a driving decision unit).

Additionally or alternatively, driving decisions associated with any of the sensed information units fed to any of the entities may be provided and the method may include determining which driving decisions were correct one. For example—this may be determined using statistics—for example adopting the most common driving decision per situation and/or scenario, or any par therein.

Method 300 may start an initialization step 310.

Step 310 may include obtaining a perception unit, narrow AI agents and a driving decision unit configured to execute various steps of method 300.

The obtaining may include receiving after being trained, and/or training and/or receiving at any stage of the training process, downloading instructions or otherwise configuring a computerized system to execute any other step of method 300.

Step 310 may include at least one of (a) training at least one of the perception unit, the narrow AI agents, and the driving decision unit, (b) receiving at least one of already trained perception unit, the narrow AI agents, and the driving decision unit, (c) otherwise configuring the at least one of the perception unit, the narrow AI agents, and the driving decision unit.

Step 310 may be followed by step 320 of obtaining one or more sensed information units.

The obtaining may include sensing, receiving without sensing, preprocessing, and the like.

Step 320 may be followed by step 330 of determining, by a perception unit and based on the one or more sensed information units, one or more relevant narrow AI agents of the ensemble that may be relevant to a processing of the one or more sensed information units. The entire ensemble may be relevant to a first plurality of scenarios.

Each relevant narrow AI agent may be relevant to a dedicated class. The class may be associated with an anchor. Step 330 may include searching for the anchor.

Each class may be defined by at least a part of one or more scenarios, wherein the at least part of the one or more scenarios may be a fraction of the first plurality of scenarios.

The different narrow AI agents may be trained to respond to different scenarios that may be (or may include) a T-junction, different road elements, a zebra crossing, roundabout, obstacles, different environmental conditions, rain, fog, night, straight highway, going up the hill, traffic jam, . . . ). Example of different obstacles and/or of different road elements is illustrated in PCT patent application WO2020/079508 titled METHOD AND SYSTEM FOR OBSTACLE DETECTION which is incorporated herein in its entirety.

The different scenarios may be different situations or may differ from situations.

A scenario may be, for example at least one of (a) a location of the vehicle, (b) one or more weather conditions, (c) one or more contextual parameters, (d) a road condition, (e) a traffic parameter.

Various examples of a road condition may include the roughness of the road, the maintenance level of the road, presence of potholes or other related road obstacles, whether the road is slippery, covered with snow or other particles.

Various examples of a traffic parameter and the one or more contextual parameters may include time (hour, day, period or year, certain hours at certain days, and the like), a traffic load, a distribution of vehicles on the road, the behavior of one or more vehicles (aggressive, calm, predictable, unpredictable, and the like), the presence of pedestrians near the road, the presence of pedestrians near the vehicle, the presence of pedestrians away from the vehicle, the behavior of the pedestrians (aggressive, calm, predictable, unpredictable, and the like), risk associated with driving within a vicinity of the vehicle, complexity associated with driving within of the vehicle, the presence (near the vehicle) of at least one out of a kindergarten, a school, a gathering of people, and the like. A contextual parameter may be related to the context of the sensed information—context may be depending on or relating to the circumstances that form the setting for an event, statement, or idea.

A relevant narrow AI agent may be trained to respond to one or more situations out of a much large number of situations. Examples of situations and situation based processing are illustrated in U.S. patent application Ser. No. 16/035,732 which is incorporated herein by reference.

Each class may be defined by an anchor that may be a contextual cue. Step 320 may be executed without detection of objects that may be below a predefined number of pixels. The predefined number of pixels does not exceed few tens of pixels.

The narrow AI agents may be end-to-end narrow AI agents.

For at least some of the narrow AI agents, the respective fraction may be smaller than one percent of the first plurality of scenarios.

Step 330 may be followed by step 340 of sending the one or more sensed information units to the relevant narrow AI agents.

It should be noted that once the one or more relevant narrow AI agents are determined they may be uploaded to a processor and/or a memory unit. This reduces the RAM or other memory resources required to store and execute step 350.

Step 340 (or method 300) may include maintaining at least one irrelevant narrow AI agent in a low power mode (idle, inactivated, in sleep mode, partially operational, and the like) in which a power consumption of the at least one irrelevant narrow AI agent may be lower than a power consumption of a relevant narrow AI agent.

Step 340 may be followed by step 350 of processing the one or more sensed information units, by the one or more relevant narrow AI agents, to provide one or more narrow AI agent driving decisions. Each narrow AI agent may be relevant to a respective fraction of the first plurality of scenarios managed by the entire ensemble.

A narrow AI agent driving decision may be a command, a request, or a recommendation for autonomously controlling a vehicle.

A narrow AI agent driving decision may be an advanced driver-assistance systems (ADAS) command, an ADAS request, or an ADAS recommendation.

Step 350 may be followed by step 360 of processing, by a driving decision unit, the one or more narrow AI agent driving decisions to provide an output driving decision.

Step 360 may include averaging the one or more narrow AI agent driving decisions, or applying one or more functions (for example—predefined and/or learnt and/or change over time), and/or applying one or more policies on the one or more narrow AI agent driving decisions. An example of a policy—attempting to reduce risk—for example in case of two narrow AI agents driving decision of different speeds—selecting the lower speed.

Method 300—especially steps 320-360 may be repeated multiple times—for example multiple times a second, once a second, one per a few seconds, continuously or non-continuously.

Figure 4:
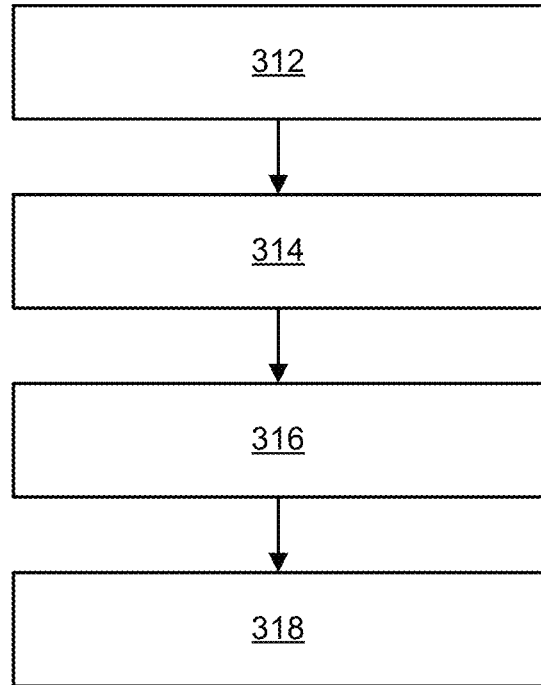
FIG. 4 illustrates an example of a step of the method of FIG. 3.

FIG. 4 illustrates an example of step 310.

Step 310 may include step 312 of training the perception unit to classify sensed information units to classes.

Each class may be at least a part of one or more scenarios, the one or more scenarios may be a fraction of the first plurality of scenarios.

Each class may be associated by an anchor. The anchor may be used to classify a sensed information unit to the class.

Step 312 may include receiving, by the perception unit a definition of at least some of the classes before training. This may include, for example, receiving labels or any other class defining information.

Step 312 may include defining, by the perception unit at least some of the classes.

The defining may include, for example generating signatures, and clustering the signatures to concept structures such as clusters. The clustering virtually define the classes.

The clusters may all belong to the same level or may be arranged in a hierarchical manner. The clustering, inherently, may be responsive to the statistics of the contextual cues—more frequently occurring contexts may be segmented to more clusters. Larger clusters may be split to clusters of lower level—in any manner—for example by cross correlation between cluster members, by finding shared signatures portions and unique signature portions, and the like.

Step 312 may include performing an unsupervised training.

At least part of one or more scenarios may be at least one out of (a) one or more factors of a scenario, (b) one or more element of a scenario, (c) one or more parameters of a scenario, and (d) one or more variables of a scenario.

Step 312 may be include feeding the perception unit with a first dataset of sensed information units.

Step 312 may be followed by step 314 of using the trained perception unit to classify sensed information units of a second dataset. There sensed information units are referred to as second sensed information units.

Step 314 may also include feeding one or more driving decision per class.

Each class will include multiple second sensed information units and one or more driving decision.

Each narrow AI agent may be associated with a dedicated class. Step 314 may be followed by step 316 of training each narrow AI agent to output a narrow AI agent driving decision associated with the dedicated class.

The training of step 316 may include feeding a narrow AI agent associated with a given class with second sensed information and one or more driving decisions of the class.

Step 316 may be executed in a supervised or non-supervised manner A supervised training may include providing one or more driving decision as the requested output of the narrow AI agent.

Step 316 may be followed by step 318 of training the driving decision unit to provide an output driving decision based on one or more narrow AI agent driving decisions.

Step 318 may include feeding sensed information units of the third dataset (hereinafter third sensed information units) to the perception unit, allowing the perception unit to determine the relevant narrow AI classes (based on the classes of the third sensed information units), allow the relevant narrow AI classes to output narrow AI agent driving decisions and feed the driving decision unit with the narrow AI agent driving decisions and driving decisions associated with the third dataset.

Each one or the first, second, and third datasets may include any number of sensed information unit, may be generated in any manner They may include randomly selected sensed information unit- or any combination of sensed information units.

There may be provided a non-transitory computer readable medium that may store instructions for operating an ensemble of narrow AI agents, the operating may include obtaining one or more sensed information units; determining, by a perception unit and based on the one or more sensed information units, one or more relevant narrow AI agents of the ensemble that are relevant to a processing of the one or more sensed information units; wherein the ensemble is relevant to a first plurality of scenarios; processing the one or more sensed information units, by the one or more relevant narrow AI agents, to provide one or more narrow AI agent driving decisions; wherein each narrow AI agent is relevant to a respective fraction of the first plurality of scenarios; and processing, by a driving decision unit, the one or more narrow AI agent driving decisions to provide an output driving decision.

A system for driving decision determination, the system may include an ensemble of AI narrow agents; a perception unit that is configured to: obtain one or more sensed information units; and determine, based on the one or more sensed information units, one or more relevant narrow AI agents of the ensemble that are relevant to a processing of the one or more sensed information units; wherein the ensemble is relevant to a first plurality of scenarios; wherein the one or more relevant narrow AI agents are configured to process the one or more sensed information units, to provide one or more narrow AI agent driving decisions; wherein each narrow AI agent is relevant to a respective fraction of the first plurality of scenarios; and a driving decision unit that is configured to process the one or more narrow AI agent driving decisions to provide an output driving decision.

Using Multiple Perception Modules

The elements that affect a vehicle may be of different domains. It has been found by the inventors that allocating perception modules per domain instead of using a single perception unit provides various technical benefits such as:

Reducing the computational and/or memory resources allocated to the selection of narrow AI agents—as the overall perception modules are smaller than a single perception unit that is used for managing all information domains.

Reducing the computational and/or memory resources allocated to the training—as each perception module is trained using much more compact information and has cover much less classification scenarios.

Providing a more accurate selection of narrow AI agents—a perception module allocated to a domain can be better tailored to selection related to the domain. This does not force the perception module to provide a tradeoff between different domains of information.

Simplifying an adaption to a new domain of information—which required to train or add an already trained perception module dedicated to the new domain of information.

Change the selection of perception modules (of a group of perception modules) in dynamic manner—when the domains of the information change.

Maintaining unselected perception modules of the group in an idle state—therefore reducing power consumption.

Retrieving information regarding the selected perception modules—while preventing from retrieving information regarding non-selected perception modules—which reduces power consumption and/or reduces memory resources allocated to the selection of the narrow AI agents.

FIG. 5A illustrates an example of method 500 for an operation of narrow artificial intelligence (AI) agents for at least partially autonomous driving.

According to an embodiment, method 500 includes step 510 of automatically selecting multiple perception modules out of a group of perception modules.

According to an embodiment, selecting is based on domains associated with the multi-domain information.

According to an embodiment, the selecting is based on a previously generated output of a perception module of the group of perception modules. For example—assuming that there is not enough light (can be sensed by image processing, location and time information—for example driving a non-illuminated road within a non-illuminated environment during a moonless night)—then a perception module that is based on image processing may not be activated.

According to an embodiment, at least two different perception modules are associated with two different vehicle sensors. The selecting may be based on an operational state of the two different vehicle sensors. For example—assuming that one vehicle sensor malfunctioned or is found to generate unreliable sensed information—then a perception routed associated with that vehicle sensor may be unselected, maintained in idle mode, and the like.

According to an embodiment, step 510 may include or may be followed by maintaining perception modules of the group that differ from the multiple perception modules in an idle mode.

According to an embodiment, the multiple perception modules are multiple perception routers. According to an embodiment, the multiple perception modules are multiple perception sub-routers associated with a perception router. Examples of a perception router are illustrated in U.S. patent application Ser. No. 18/036,150 which is incorporated herein by reference.

According to an embodiment, step 510 is followed by step 520 of receiving, by multiple perception modules, multi-domain information about elements affecting a vehicle. Each one of the multiple perception module is associated with a dedicated domain of the multi-domain information.

According to an embodiment, step 520 is followed by step 530 of generating, by the multiple perception modules, class signatures that are indicative of classes of the elements of the multi-domain information.

According to an embodiment, a perception module is a classifier that is configured to classify information of the domain associated with the perception module. The classifier may implement a machine learning process, may be a deep neural network (DNN), may be a neural network other than a DNN, may differ from a neural network, and the like.

According to an embodiment, step 530 is followed by step 540 of determining a multi-domain identifier (MDI) that identifies the generated class signatures of the multiple perception modules. The MDI may be a concatenation of the class signatures, or may identify the generated class signatures in any other manner.

According to an embodiment, step 540 is followed by step 550 of identifying, based on the MDI, one or more narrow AI agents that are relevant to a processing of at least a part of the MDI.

According to an embodiment, the one or more narrow AI-agents are associated with clusters of MDIs. For example, a first narrow AI-agent may be associated with a first set of one or more MDI clusters and a second narrow AI-agent may be associated with a second set of one or more MDI clusters. The number of MDIs of the first set may be the same as the number of MDIs of the second set. The number of MDIs of the first set may differ from the number of MDIs of the second set. The first set and the second set may share one or more MDI. The first set and the second set may not include any shared MDIs.

A narrow AI agent or a cluster of MDIs may be associated with a skill. The selection of one or more narrow AI agents may virtually include selecting one or more skills that are required for coping with a situation or a scene.

According to an embodiment, the multi-domain information is input from at least one of:

Road setting information related to static objects within an environment of the vehicle. Examples of static objects include road elements (lanes, curve, junction, roundabout), static elements other than road elements (houses, trees), location information (city, country, urban environment, non-urban environment).

Road user information related to movable road users within the environment. Examples of movable road users include pedestrians, other vehicles. The road user information may include information about location and/or behavior of road users.

Traffic rule indication information related to visual traffic rules indicators within the environment. The traffic rule indications may be traffic signs, content written on the road and indicative of traffic rules (for example lane borders, zebra crossings, arrows indicative of the allowed driving direction, text, symbols and the like).

Regulation information related to legal constraints related to the environment. Legal constraints may include maximal speed, minimal speed, and the like. The regulation information may be obtained from location based regulation information or from other sources.

Ambient condition information related to at least one of weather and light conditions of the environment.

Vehicle state information related to a motion related state of the vehicle.

According to an embodiment, the multiple perception modules may include at least one of:

A road setting perception module. The road setting perception module may be configured to generate a class signature indicative of one or more classes of one or more static objects within an environment of the vehicle. The class signature may be indicative of a scenario that includes all the static object that (i) may affect the vehicle, and (ii) are within the environment of the vehicle.

A road user perception module. The road user perception module may be configured to generate a class signature that is indicative of a class related to movable road users. The class signature may be indicative of a scenario that includes all the movable road users that (i) may affect the vehicle, and (ii) are within the environment of the vehicle.

A traffic rule perception module. The traffic rule perception module may be configured to generate a class signature that is indicative of a class of traffic rules indicated by traffic signs or other elements captured in the image. The class signature may be indicative of a scenario that includes all the traffic rules that (i) may affect the vehicle, and (ii) are indicated by traffic rule indicators that are within the environment of the vehicle.

A regulation perception module. The regulation perception module may be configured to generate a class signature that is indicative of a class of legal constraints. The class signature may be indicative of a scenario that includes all the legal constraints that (i) may affect the vehicle, and (ii) are applicable to the environment of the vehicle.

An ambient condition perception module. The ambient condition perception module may be configured to generate a class signature that is indicative of a class of ambient conditions within the environment of the vehicle—such as at least one of weather and light conditions of the environment.

A vehicle state perception module. The vehicle state module may be configured to generate a class signature that is indicative of a class of vehicle state—especially to a motion related state of the vehicle. The motion related state may include kinematic information, speed information, acceleration information, and the like.

It should be noted that any other perception modules may be provided and that at any given point in time one or more of said perception modules may be selected. There may be any number of domains and any number of perception modules allocated to the domains.

According to an embodiment, the identifying of step 550 triggers execution of further processing the at least a part of the multi-domain information by the identified one or more narrow AI agents to provide one or more narrow AI driving related decision.

Figure 5B:
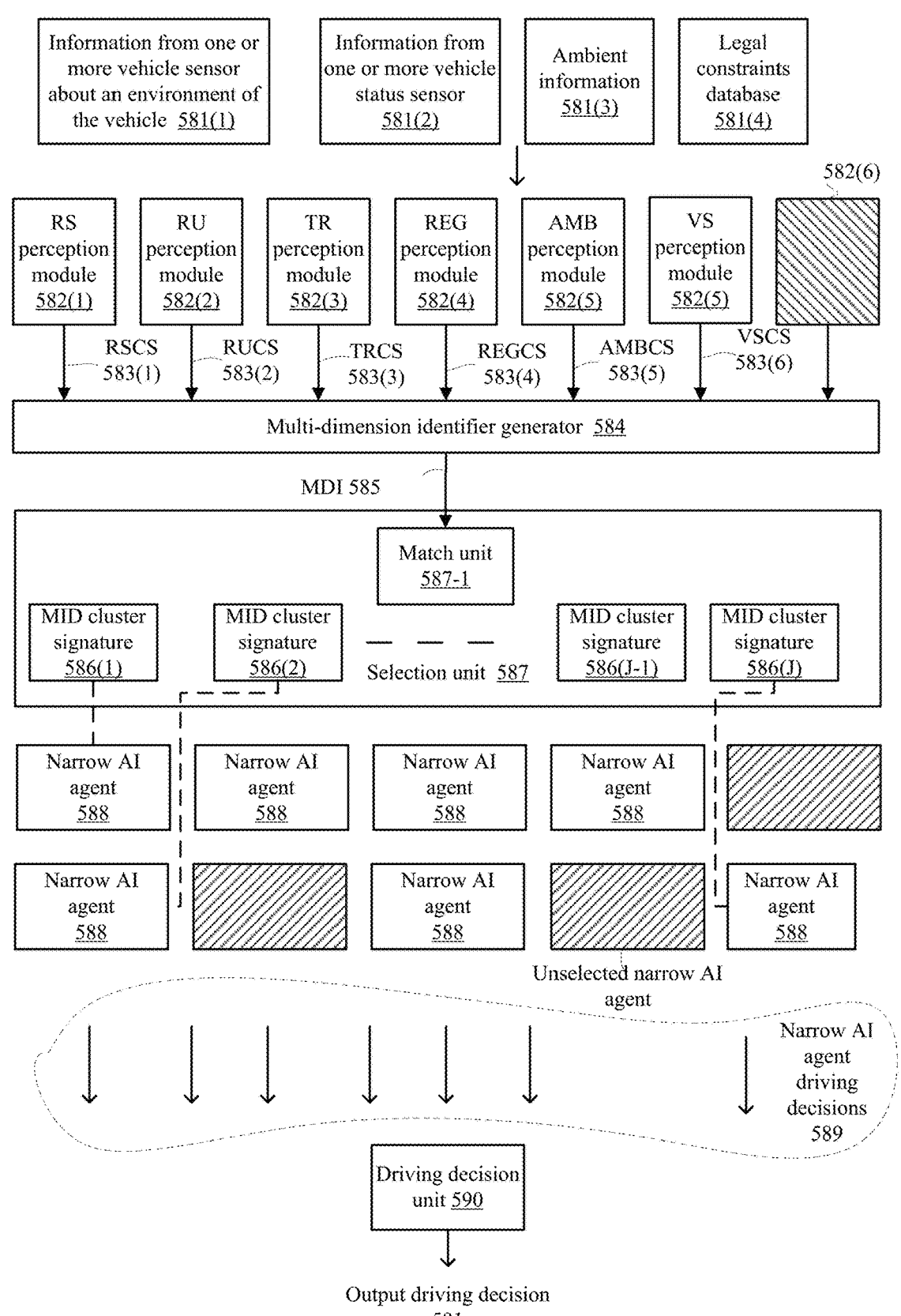
FIG. 5B illustrates an example of an implementation of the method.

FIG. 5B illustrates an example of various information sources, various perception modules, a MDI generator, a selection unit narrow AI agents and a driving decision unit.

The various information sources include:

Information 581(1) from one or more vehicle sensor about an environment of the vehicle.

Information 581(2) from one or more vehicle status sensor.

Ambient information 581(3).

Legal constraints database 581(4).

The perception modules include:

A road setting perception module—denoted RS perception module 582(1).

A road user perception module—denoted RU perception module 582(2).

A traffic rule perception module—denoted TR perception module 582(3).

A regulation perception module—denoted REG perception module 582(4).

An ambient condition perception module—denoted AMB perception module 582(5).

A vehicle state perception module—denoted VS perception module 582(6).

FIG. 5B also illustrates an unselected perception module 582(6) that may be idle.

The selection unit 587 identifies one or more narrow AI agents by comparing the MDI 585 to MDI cluster signatures 586(1)-586(J) to find one or more matching MDI clusters that are associated with one or more narrow AI agents to be selected.

The matching MDI clusters are indicative of the narrow AI agents (denoted 588) that should be selected. FIG. 5B also illustrates unselected narrow AI agents (denoted as including a dashed line inner pattern).

The selected narrow AI agents 588 output narrow AI agent driving decisions 589.

A driving decision unit 590 is configured to receive the narrow AI agent driving decisions 589, and generate and output an output driving decision 591 that may be executed by one or more units of the vehicle.

Figure 5C:
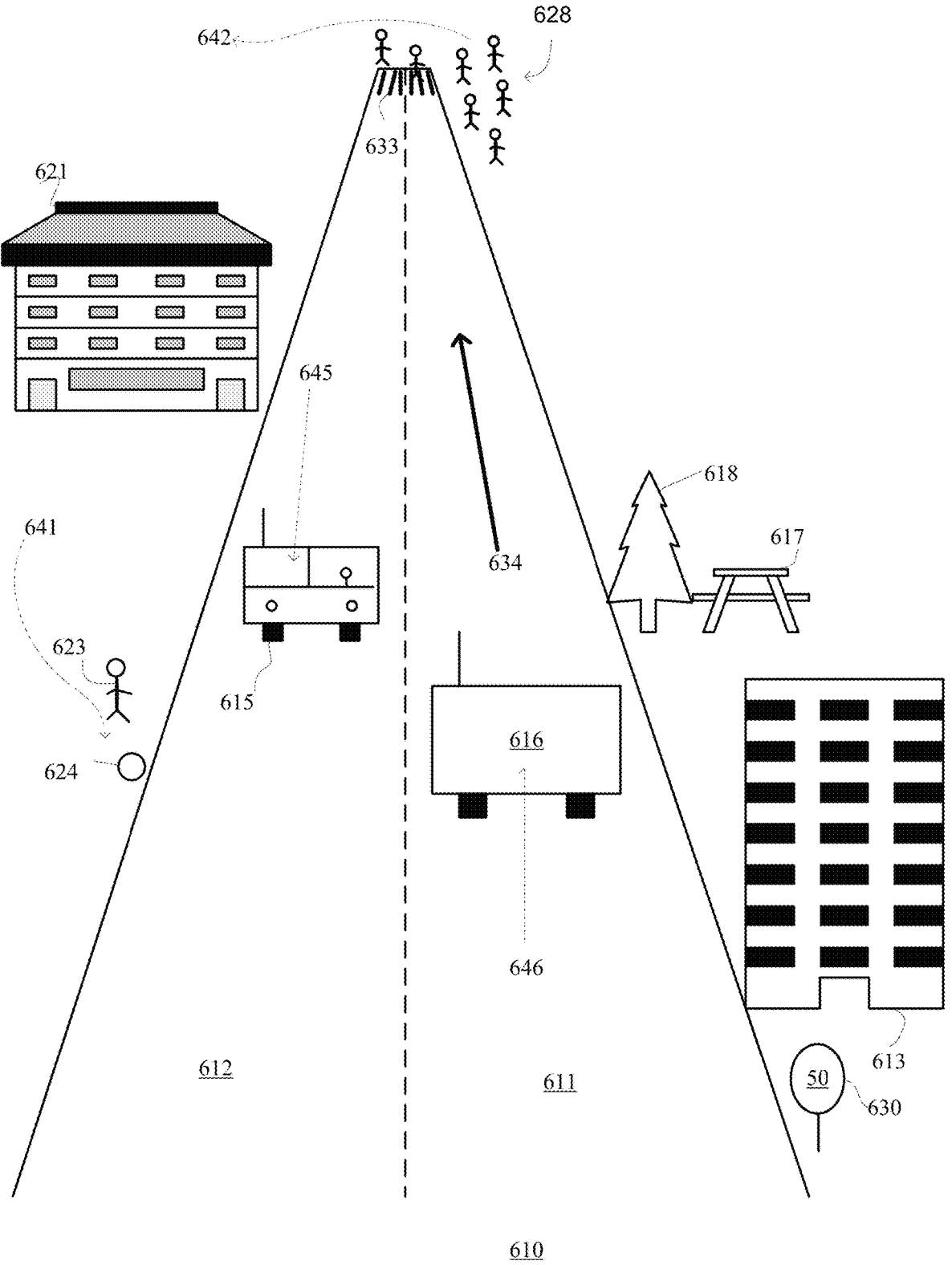
FIG. 5C illustrates an example of an image.

FIG. 5C illustrates an example of an image 610 acquired by a vehicle sensor.

Image 610 shows two lanes 611 and 612 of a road, right building 613, first vehicle 615, second vehicle 616, tree 618, table 617, left building 621, child 623, ball 624, traffic sign 630 indicative of a maximal speed limit (for example—50 Km/H), driving direction arrow 634, zebra crossing 633 and a crowd 628 that is in the process of reaching the zebra crossing and passing the zebra crossing from right to left. FIG. 6 also illustrates a progress (behavior) 641 of child 623, a progress 642 of crowd 628, a progress 645 of first vehicle 615, and a progress 646 of second vehicle 616.

Road user information may be indicative of movable road users such as first vehicle 615, second vehicle 616, child 623 and crowd 628.

Road setting information may be indicative of static objects selected out of lanes 611 and 612, road 610, tree 618, table 617, right building 613 and left building 621—not all of these static objects can be taken into account—as not all of these static objects impact the vehicle.

Traffic rule indication information is indicative of traffic sign 630, driving direction arrow 634 and lane boundaries.

Ambient condition information may indicate that the environment of the vehicle is illuminated by solar radiation and is not obscured by for, rain or other weather elements.

Vehicle state information may be learnt from information not included in the image.

Regulation information may be learnt from information not included in the image.

Figure 5D:
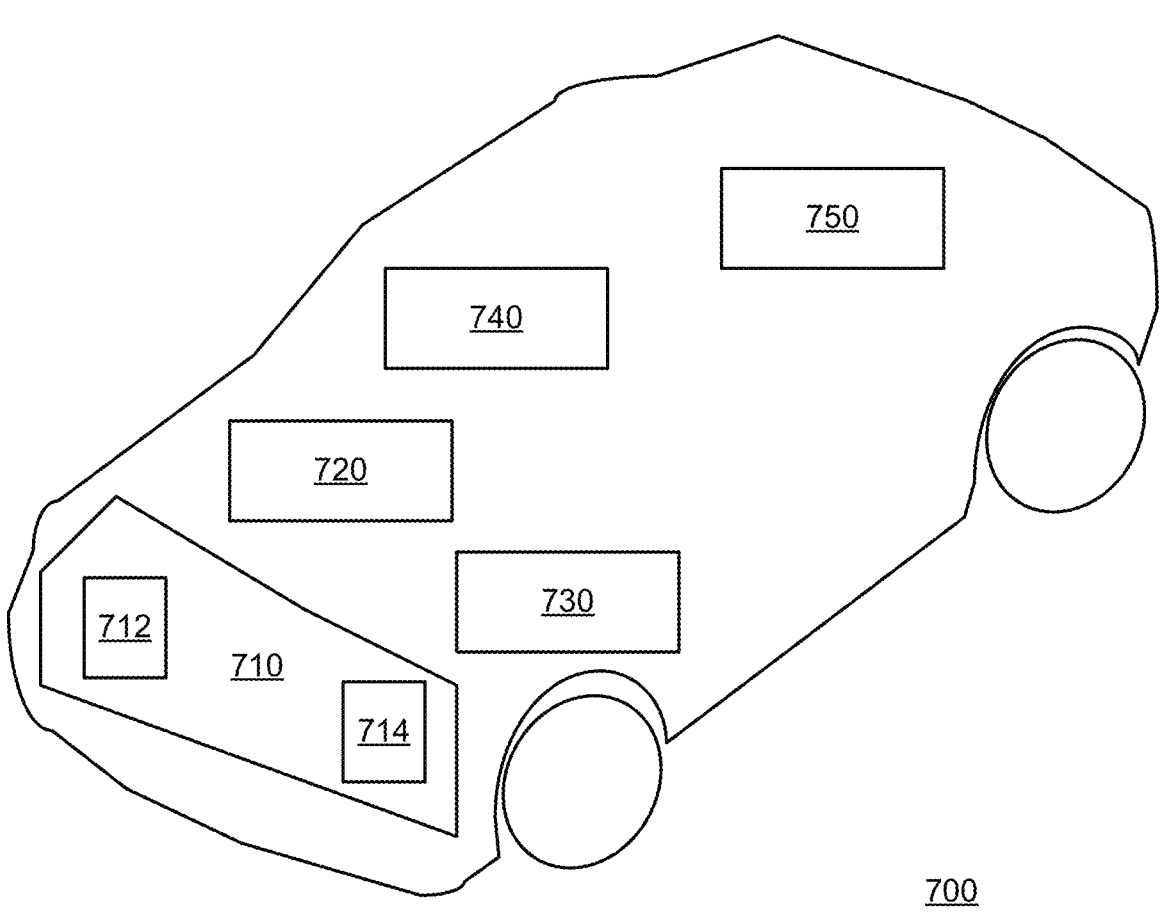
FIG. 5D illustrates an example of a vehicle.

FIG. 5D illustrates an example of vehicle 700. Vehicle 700 includes a vehicle sending unit 710 that may include one or more sensors such as vehicle sensors 712 and 714. Vehicle also includes one or more processing circuits denoted 720, memory unit 730, communication unit 740, and one or more vehicle units such as one or more vehicle computers, units controlled by the one or more vehicle units, motor units, chassis, wheels, and the like.

The one or more processing circuits are configured to execute method 600.

FIG. 5E illustrates an example of method 800.

According to an embodiment, Method 800 includes steps 510, 520, 530, 540 and 550.

According to an embodiment, method 800 includes step 860 of triggering of the further processing of the at least part of the multi-domain information by the identified one or more narrow AI agents to provide one or more narrow AI driving related decision.

According to an embodiment, method 800 includes step 870 of further processing of the at least part of the multi-domain information by the identified one or more narrow AI agents to provide one or more narrow AI driving related decision.

According to an embodiment, method 800 includes step 360 of processing, by a driving decision unit, the one or more narrow AI agent driving decisions to provide an output driving decision.

It should be noted that method 800 may include only one or two of steps 860, 870 and 360.

FIG. 5F illustrates an example of method 900.

According to an embodiment, method 900 includes step 910 of receiving information, by one or more identified narrow AI agents. The information may be the multi-dimensional information fed to the multiple perception modules, one or more segments of the multi-dimensional information fed to the multiple perception modules or any representation or metadata about at least a part of the multiple perception modules.

According to an embodiment, the one or more identified narrow AI agents were identified by executing method 500.

According to an embodiment, step 910 is followed by step 920 of processing of information by the identified one or more narrow AI agents to provide one or more narrow AI driving related decisions to be sent to a driving decision unit. The one or more narrow AI driving related decisions may trigger generation of one or more output driving decisions from the driving decision unit. The one or more output driving decisions may be one or more commands or requests or recommendations to various modules of a vehicle and/or to a driver.

FIG. 5G illustrates an example of method 1000.

According to an embodiment, method 1000 includes step 1010 of receiving, by a driving decision unit, one or more narrow AI driving related decisions from identified one or more narrow AI agents.

According to an embodiment, step 1010 is followed by step 1020 of determining, by the driving decision unit, one or more output driving decisions. The one or more output driving decisions may be one or more commands or requests or recommendations to various modules of a vehicle and/or to a driver.

There may be a non-transitory computer readable medium for operation of narrow artificial intelligence (AI) agents for at least partially autonomous driving, the non-transitory computer readable medium stores instructions for: receiving, by multiple perception modules, multi-domain information about elements affecting a vehicle; wherein each one of the multiple perception module is associated with a dedicated domain of the multi-domain information; generating, by the multiple perception modules, class signatures that are indicative of classes of the elements of the multi-domain information; determining a multi-domain identifier that identifies the generated class signatures of the multiple perception modules; and identifying, based on the multi-domain identifier, one or more narrow AI agents that are relevant to a processing of at least a part of the multi-domain information. The identifying triggering execution of further processing the at least a part of the multi-domain information by the identified one or more narrow AI agents to provide one or more narrow AI driving related decision.

According to an embodiment, the multiple perception modules are multiple perception routers.

According to an embodiment, the multiple perception modules are multiple perception sub-routers associated with a perception router.

The non-transitory computer readable medium stores instructions for automatically selecting the multiple perception modules out of a group of perception modules.

According to an embodiment, the selecting is based on domains associated with the multi-domain information.

According to an embodiment, the selecting is based on a previously generated output of a perception module of the group of perception modules.

According to an embodiment, at least two different perception modules are associated with two different vehicle sensors, wherein the selecting is based on an operational state of the two different vehicle sensors.

The non-transitory computer readable medium stores instructions for maintaining perception modules of the group that differ from the multiple perception modules in an idle mode.

According to an embodiment, the multi-domain information is input from one of road setting information related to static objects within an environment of the vehicle; road user information related to movable road users within the environment; traffic rule indication information related to visual traffic rules indicators within the environment; regulation information related to legal constraints related to the environment; ambient condition information related to at least one of weather and light conditions of the environment; and vehicle state information related to a motion related state of the vehicle.

Prediction

It has been found that introducing prediction in the context of using perception modules allocated per domain provides various technical benefits such as:

Prediction improves management of memory units (such as but not limited to cache memory units)—for example by increasing the accuracy of pre-fetch operations thereby reducing latency associated with memory misses and reducing the memory consumption—as fewer fetch operations are required.

Prediction reduces, at least in most cases, the urgency of processing sensed information and responding the sensed information—and may reduce the operational speed of processing resources allocated to execute perception modules and/or AI agents. The reduction of operational speed reduces the energy consumption and lengthens the lifespan of the processing resource.

Prediction may allow to perform smoother driving operations—which is beneficial to various units of the vehicle (for example from a mechanical point of view). Furthermore—some smoother driving operations may be represented by less coefficients—thereby reduces computational resources and may also reduce memory resources.

Predictions may allow to better determine future progress of the vehicle—for a longer period in advance—thereby reducing computational and/or memory resources required for more repetition of short term determining of the progress of the vehicle.

FIG. 6A is an example of method 1100 for managing a group of narrow artificial intelligence (AI) agents for at least partially autonomous driving.

According to an embodiment, method 1100 includes step 1110 of obtaining, by a prediction circuit, a stream of metadata segments generated at multiple points in time and associated with a selection of one or more sub-groups of the group of narrow AI agents.

According to an embodiment, the metadata segments are selected narrow AI agent identifiers.

According to an embodiment, the metadata segments are multiple multi-domain identifiers (MDIs). The multiple MDIs are indicative of multiple instances of multi-domain information about elements affecting a vehicle in relation to the multiple points in time (PITs). A MDI generated at a given point of time of the multiple points in time is a combination of class signatures that are indicative of classes of elements of a multi-domain information associated with the given point in time. The metadata segments may be generated using method 500.

According to an embodiment, step 1110 is followed by step 1120 of finding, by the prediction circuit, a segment of the stream that is a predictor to a receiving of a next cluster identifier at a future point in time.

Step 1120 may include any prediction process—including but not limited to a machine learning prediction process, a non-machine learning process, applying a Kalman filter, applying any predictive filter, and the like.

According to an embodiment, step 1120 is followed by step 1130 of automatically predicting, when finding the predictor, at least one of:

Future metadata segments to be received during the future point of time.

A future sub-group of narrow AI agents to be selected at the future point of time.

According to an embodiment, there is a known mapping between the metadata segments and one or more selected narrow AI agents—as a given metadata segments causes a selection of one or more associated narrow AI agents.

According to an embodiment, the predicting triggers a response to the predicting.

According to an embodiment, method 1100 may include one or more additional steps (collectively denotes 1140) out of:

Triggering the response to the predicting.

Responding to the predicting.

Triggering a response that includes predicting of a next state of the vehicle at the next point of time.

Triggering a response that includes determining a future progress of the vehicle based on one or more next states of the vehicle at one or more next points of time.

Determining a future progress of the vehicle based on one or more next states of the vehicle at one or more next points of time. This may include smoothing the future progress of the vehicle. The smoothing is compared to a future progress of the vehicle without the prediction.

Triggering a determination of a response to the next state of the vehicle.

Determining a response to the next state of the vehicle.

Evaluating an accuracy of the predictor.

Predicting, based on the predictor, selected perception modules out of multiple perception modules, to be utilized during the future point in time.

Triggering an execution of a driving related operation at a point in time that does not exceed the future point of time. The driving related operation may involve changing a speed of the vehicle. The method, wherein the driving related operation involves changing a direction of the vehicle.

Figure 6B:
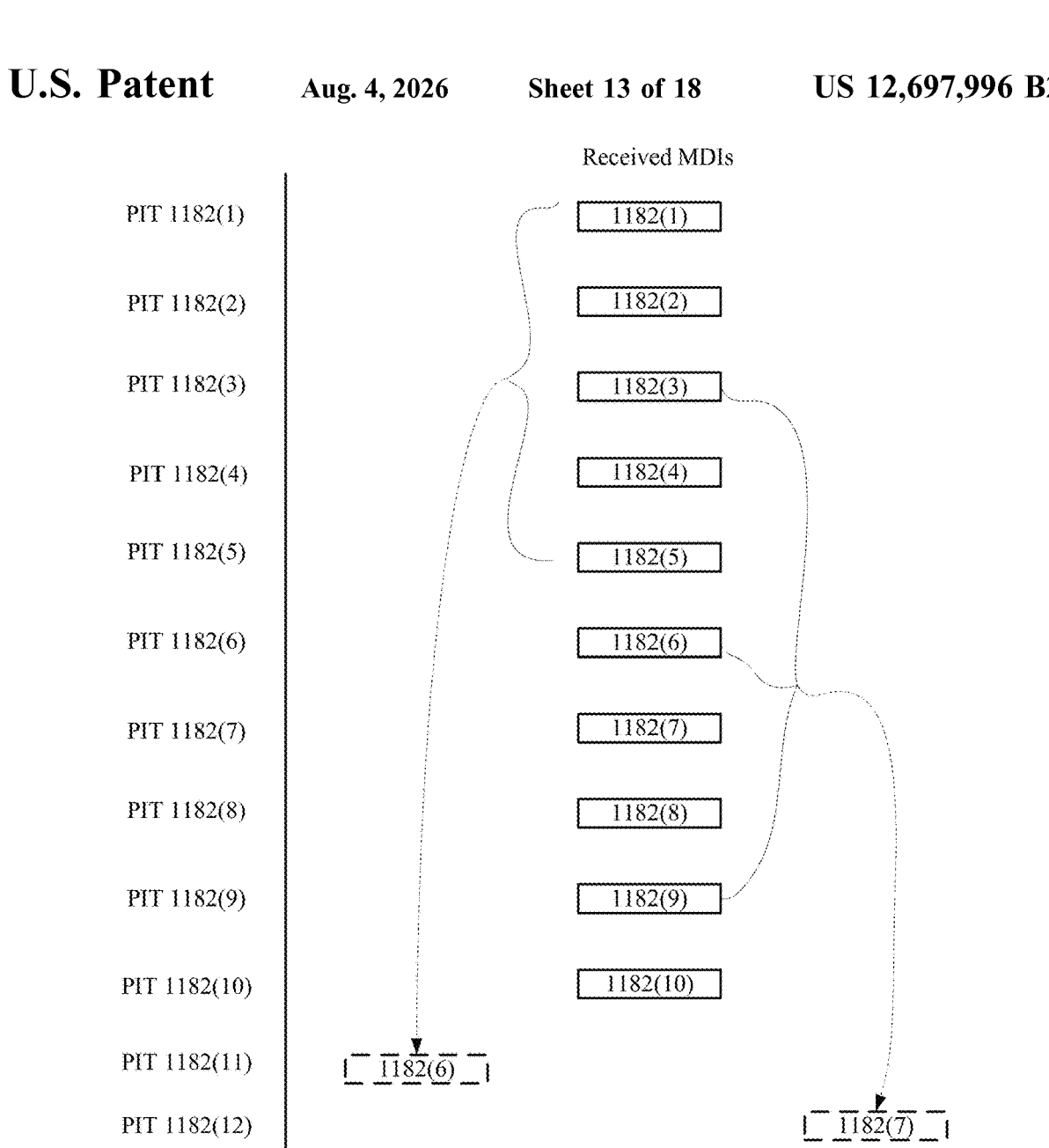
FIG. 6B illustrates an example of a prediction.

FIG. 6B is an example of a stream of metadata segments generated at multiple points in time and associated with a selection of one or more sub-groups of the group of narrow AI agents. In FIG. 6B it is assumed that the metadata segments are multiple MDIs denoted 1180(1)-1180(10) that are associated with different points in time (PITs) 1182(1)-1182(10).

In FIG. 6B it is assumed that:

A first predictor that includes values of a sub-steam that includes MDIs 1182(1)-1182(5)—indicates that at future PIT (for example PIT 1182(11)) an MDI that has a value equal to MDI 1182(6) will be outputted.

A second predictor that includes values of a sub-stream that includes MDI 1182(3), MDI 1182(6) and MDI 1182(9)—indicates that at another future PIT (for example PIT 1182(12)) an MDI that has a value equal to MDI 1182(7) will be outputted.

The first and second predictors may be utilized to perform at least the following:

Maintain the values of MDI 1182(6) and MDI 1182(7) in a cache memory—at least till PIT 1182(11).

Determining the state of the vehicle at PITs 1182(10) and 1182(11)—and determining the desired state of the vehicle at PITs that precede PITs 1182(21) and 1182 (22)

In this case, the movement of the vehicle may be smoothed to prevent extensive changes of direction and/or speed at PIT 1182(9) and the like.

Figure 6C:
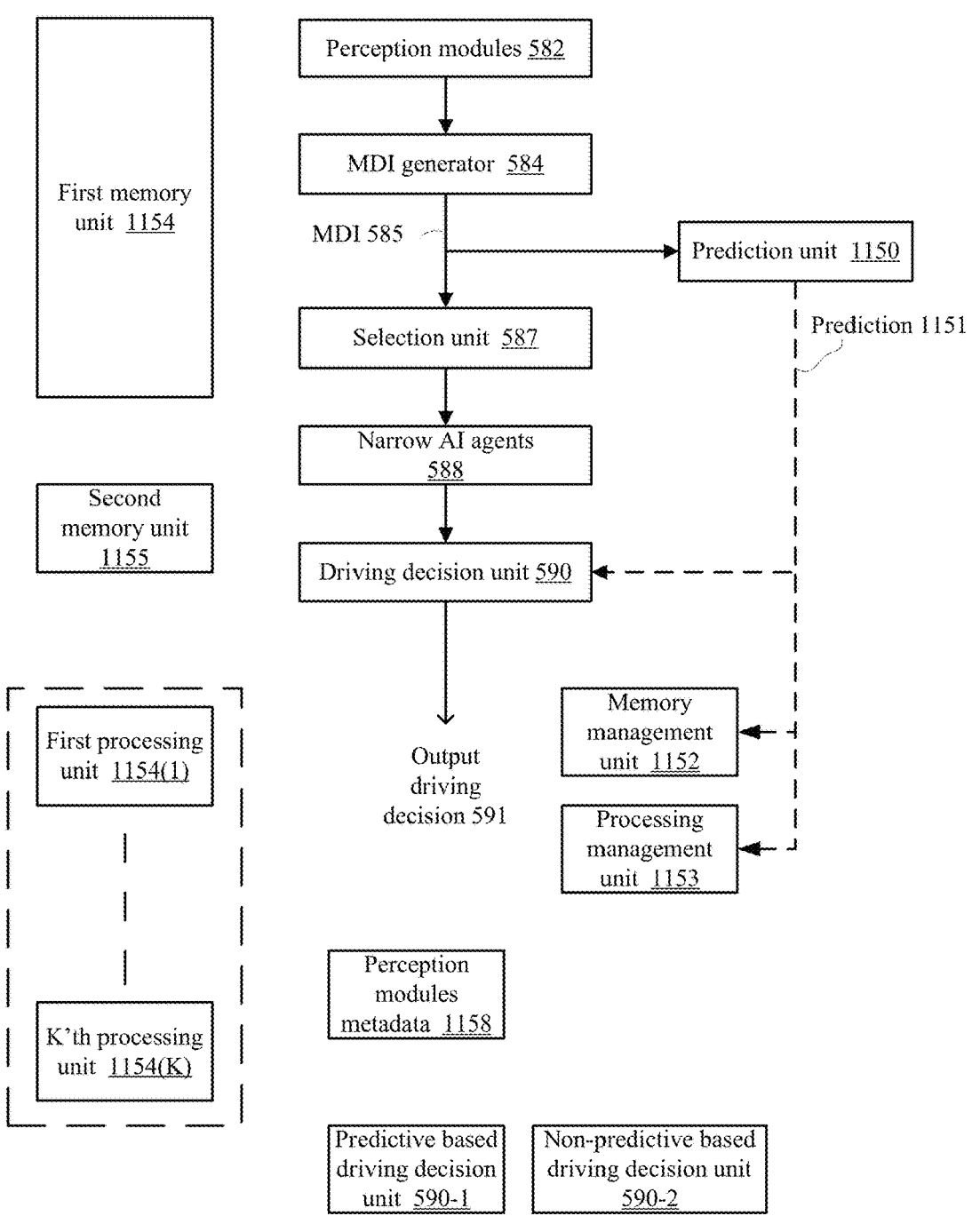
FIG. 6C illustrates an example of various units.

According to an embodiment, the selection of the narrow AI agents may be modified to take into account the predictions. For example—the multiple prediction modules referred to in figures FIG. 6C illustrates an example of:

Perception modules 582.

MDI generator 584.

Selection unit 587.

Narrow AI agents 588.

Driving decision unit 590.

Prediction unit 1150.

Memory management unit 1152.

Processing management unit 1153.

First memory unit 1154.

Second memory unit 1155.

Processing units 1154(1)-1154(K).

Perception modules metadata 1158.

Predictive based driving decision unit 590-1.

Non-predictive based driving decision unit 590-2.

The second memory unit 1155 is illustrated as being smaller than the first memory unit 1154—and for simplicity of explanation it is assumed that it is a cache memory. There may be more than two memory units.

The prediction may impact the output driving decision outputted by the driving decision unit and/or may impact a memory management unit 1152 responsible for managing one or more memory units that are used for at least partially autonomous driving and/or may impact a processing management unit 1153 configured to manage processing resources such as processing resource used to implement the perception modules and/or the selection unit and/or the narrow AI agents, and the like.

According to an embodiment, the processing units 1154 (1)-1154(K) are processing circuits or parts of processing circuits.

According to an embodiment, the processing units 1154 (1)-1154(K) are configured (for example are programmed or are hardware configured) to implement (using data and/or metadata internally stored by the processing units and/or stored in one or more of the memory units) the perception modules 582, the MDI generator 584, the selection unit 587, the narrow AI agents 588, the driving decision unit 590, the prediction unit 1150, the memory management unit 1152 and the processing management unit 1153.

According to an embodiment, the at least two of the processing units 1154(1)-1154(K) may differ from each other by at least one parameter out of an amount of computational resources, power consumption, complexity, and the like. The selection of which processing unit to activate provides a tradeoff between the different parameters of the at least two different processing units.

An execution of a perception module may require to provide perception module metadata (such as coefficients of a model of a neural network) and information (such as an information of a domain associated with the perception module) to a processing unit and/or to an associated memory unit (for example an internal memory unit of the processing units or to the second memory unit).

According to an embodiment, the prediction 1151 allows to control the fetching of information and/or perception metadata in an efficient manner—for example by at least one of (a) determining in advance pre-fetch operations that will result in cache hits, (b) determine an allocation of perception modules to processing units that may reduce the amount of configurations of the processing circuits—as it is beneficial to allocate the same processing unit to implement the same perception module during consecutive cycles of operation.

According to an embodiment, the prediction may assist in reducing power consumption of the processing units—by placing processing units not used to idle, by reducing the clock frequency of a processing module that implements any unit that may required to output a result within a few cycles—instead of outputting the result each cycle.

According to an embodiment, the driving decision unit may include a predictive based driving decision unit 590-1 and a non-predictive based driving decision unit 590-2—the former associated with driving decision at the absence of a prediction—and the later associated with driving decisions when a prediction is present—whereas the units may be selectively activated or deactivated when prediction is present or not present. The predictive based driving decision unit 590-1 may operate at lower clock frequency—or otherwise may be configured to operate at a reduced power—in relation to the non-predictive based driving decision unit 590-2.

Localized Driving

The environment of a vehicle at a different location may be location-biased in the sense that the statistical distribution of elements that may impact a vehicle at one location differs from the statistical distribution of elements that may impact the vehicle at another location.

Prediction of the environment facing the vehicle at different paths along an expected path of the vehicle may be highly effective and provide various such as technical benefits such as:

Prediction improves management of memory units (such as but not limited to cache memory units)—for example by increasing the accuracy of pre-fetch operations thereby reducing latency associated with memory misses and reducing the memory consumption—as fewer fetch operations are required.

Prediction reduces, at least in most cases, the urgency of processing sensed information and responding the sensed information—and may reduce the operational speed of processing resources allocated to execute perception modules and/or AI agents. The reduction of operational speed reduces the energy consumption and lengthens the lifespan of the processing resource.

Prediction may allow to perform smoother driving operations—which is beneficial to various units of the vehicle (for example from a mechanical point of view). Furthermore—some smoother driving operations may be represented by less coefficients—thereby reduces computational resources and may also reduce memory resources.

Predictions may allow to better determine future progress of the vehicle—for a longer period in advance—thereby reducing computational and/or memory resources required for more repetition of short term determining of the progress of the vehicle.

Figure 7A:
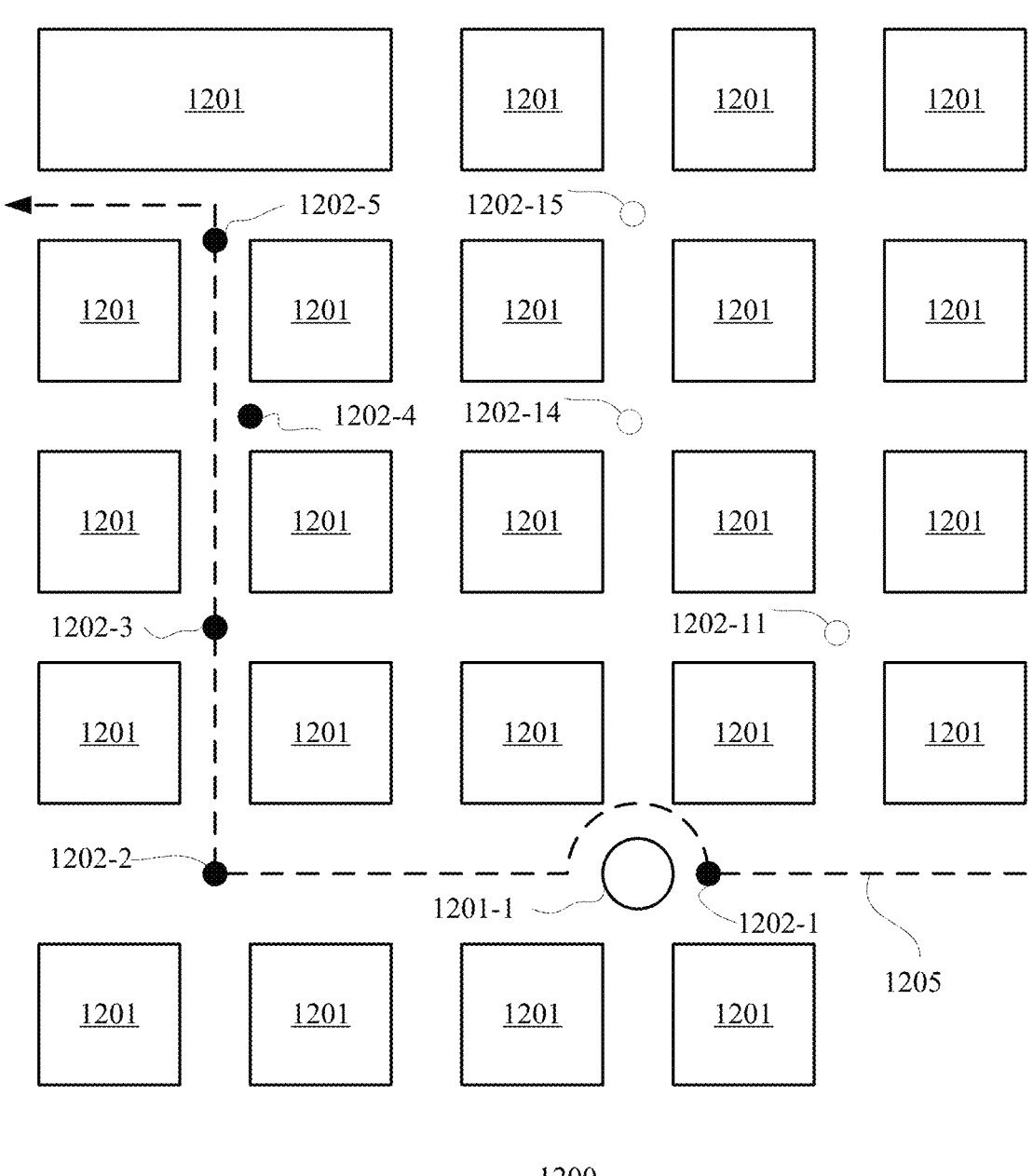
FIG. 7A illustrates an example of a unit.

FIG. 7A illustrates an example of an urban environment that includes multiple buildings 1202 that form a grid of streets. An expected local path of the vehicle (expected path of the vehicle within a small environment—for example within a distance of 10-1000 meters from the vehicle) 1205 includes moving towards the west, bypassing a roundabout 1201-1, continue moving towards the west, turning to the north, progressing towards the north, turning to the west and moving to the west.

FIG. 7A also illustrates various locations (1202-1 till 1202-5 and 1202-11 till 1202-15) that are associated with MDIs statistics. The MDIs of each location are indicative of elements affecting a vehicle at the location. The MDIs may be generated in any manner—including the manner illustrated in the text above—for example by method 500.

In the example of FIG. 7A, locations 1201-1 till 1202-5 are path related locations that are identified as such by a processing circuit based on the expected local path 1205 and information about the locations. Locations 1202-11 till 1202-15 are deemed irrelevant—for example are tool far away from the expected local path or belong to road segments not included in the expected local path.

FIG. 7B is an example of MDI statistics of the first location 1210-1, MDI statistics of the second location 1210-

2, MDI statistics of the third location 1210-3, MDI statistics of the fourth location 1210-4 and MDI statistics of the fifth location 1210-5.

In the example of FIG. 7B these MDI statistics include the most popular MDIs of each location—most popular MDIs of the first location 1210-1, most popular MDIs of the second location 1210-2, most popular MDIs of the third location 1210-3, most popular MDIs of the fourth location 1210-4, and most popular MDIs of the fifth location 1210-5.

The most popular MDIs of a location may be MDIs that occur for at least a certain amount of times at the location, or have a probability of occurrence of at least a predefined probability (for example above 10, 15, 20, 25, 30, 40 percent and the like), or be the most X'th popular MDIs—X may be determined in any manner—for example may be the most 5, 10, 15, 20, 25, 30 MDIs, and the like.

According to an embodiment, there may be one or more instances of most popular MDIs—per one or more constraints. For example—the constrains may refer to the different hours, to night or day, to different dates, to different seasons, to different weather conditions, and the like. See, for example two instances 1211-1-1 and 1211-2.

FIG. 7C illustrates an example of method 1300 for localized driving.

According to an embodiment, method 1300 includes step 1310 of obtaining information about locations that are associated with multi-domain identifiers (MDIs) statistics, MDIs of each location are indicative of elements affecting a vehicle at the location.

According to an embodiment, method 1300 includes step 1320 of obtaining an expected local path of a vehicle.

According to an embodiment, step 1310 and step 1320 are followed by step 1330 of identifying path related locations, by a processing circuit, based on the expected local path and the information about the locations.

According to an embodiment, step 1330 is followed by step 1340 of determining, by the processing circuit, expected local path MDIs statistics for use in at least partially autonomous driving of a vehicle through the expected local path.

According to an embodiment, step 1340 includes identifying most popular MDIs per path related location of the path related locations.

According to an embodiment, the determining of the expected local path MDIs statistics triggers a determining of the at least partially autonomous driving of the vehicle through the expected local path.

According to an embodiment, step 1340 is followed by step 1350 of responding to the expected local path MDIs statistics.

Step 1350 may include at least one of:

Triggering a determining of the at least partially autonomous driving of the vehicle through the expected local path.

Triggering an execution of the at least partially autonomous driving of the vehicle through the expected local path.

Predicting, based on the expected local path MDIs statistics, selected perception modules out of multiple perception modules, to be utilized during future points in times associated with the expected local path and in relation to the path related points.

Pre-fetching the selected perception modules to a cache memory.

Determining of the at least partially autonomous driving of the vehicle through the expected local path.

Executing of the at least partially autonomous driving of the vehicle through the expected local path.

According to an embodiment, the determining of the at least partially autonomous driving of the vehicle through the expected local path may fulfill at least one of the following:

Modifying the expected local path.

Be executed without modifying the expected local path.

Amend at least driving parameter (for example velocity and/or acceleration and/or direction of progress) based on the most popular MDIs along the path. For example one MDI may be indicative of an obstacle at a certain location and the driving parameter may be set to assist in bypassing the obstacle, passing over the obstacle at a reduced speed, and the like. If the vehicle is expected to be proximate to the obstacle at a certain point in time (PIT) the driving parameter may be amended in advance and even will in advance to the certain PIT.

Selecting perception modules that will be capable of managing situations indicated by the expected local path MDIs statistics.

Selecting narrow AI modules that will be capable of managing situations indicated by the expected local path MDIs statistics.

Figure 7D:
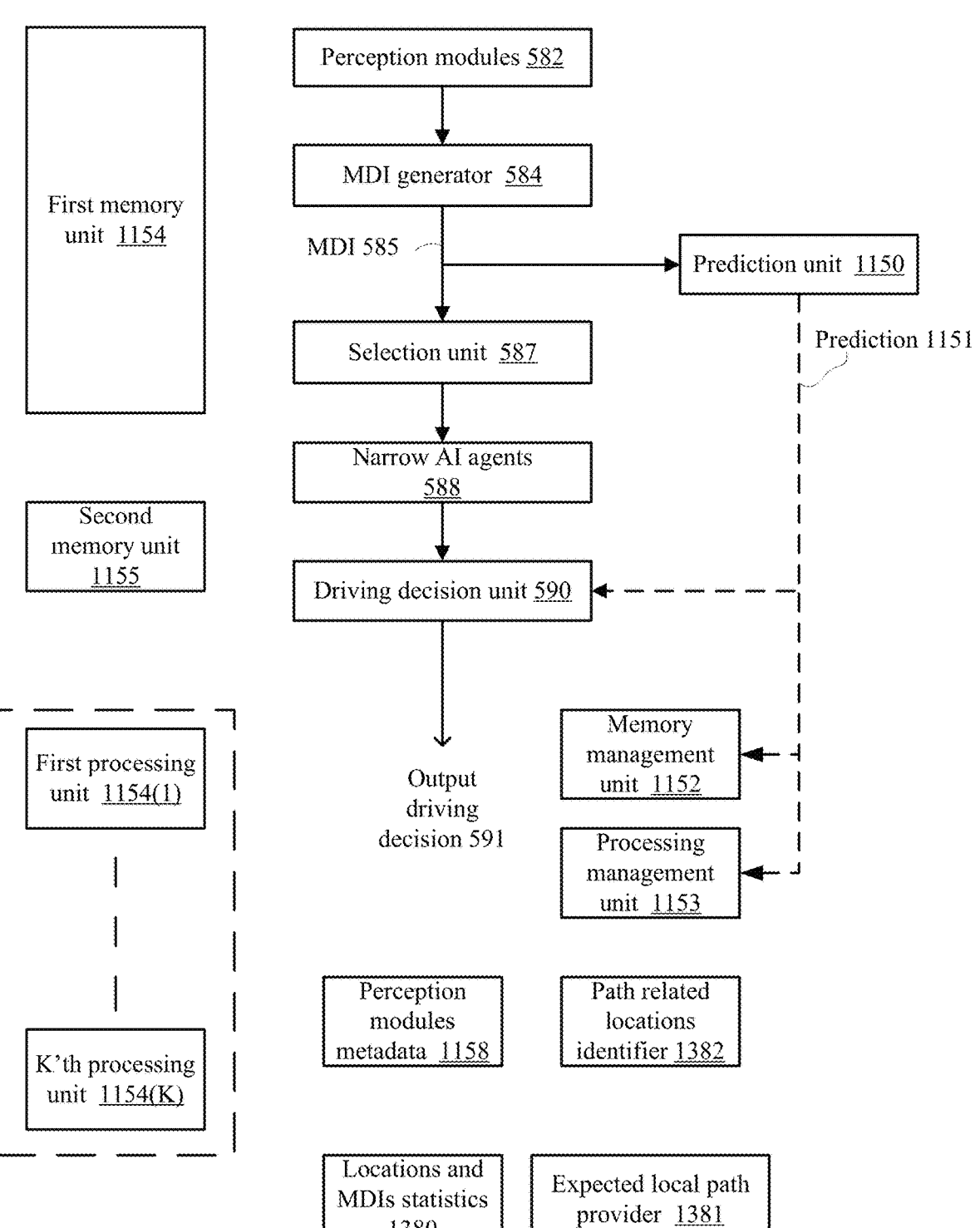
FIG. 7D illustrates an example of various units.

FIG. 7D illustrates an example of:

Perception modules 582.

MDI generator 584.

Selection unit 587.

Narrow AI agents 588.

Driving decision unit 590.

Prediction unit 1150.

Memory management unit 1152.

Processing management unit 1153.

First memory unit 1154.

Second memory unit 1155.

Processing units 1154(1)-1154(K).

Perception modules metadata 1158.

Locations and MDIs statistics 1380.

Expected local path provider 1381.

Path related locations identifier 1382.

The second memory unit 1155 is illustrated as being smaller than the first memory unit 1154—and for simplicity of explanation it is assumed that it is a cache memory. There may be more than two memory units.

The prediction (using the MDI statistics of the path related locations) may impact the output driving decision outputted by the driving decision unit and/or may impact a memory management unit 1152 responsible for managing one or more memory units that are used for at least partially autonomous driving and/or may impact a processing management unit 1153 configured to manage processing resources such as processing resource used to implement the perception modules and/or the selection unit and/or the narrow AI agents, and the like.

According to an embodiment, the processing units 1154(1)-1154(K) are processing circuits or parts of processing circuits.

According to an embodiment, the processing units 1154(1)-1154(K) are configured (for example are programmed or are hardware configured) to implement (using data and/or metadata internally stored by the processing units and/or stored in one or more of the memory units) the perception modules 582, the MDI generator 584, the selection unit 587, the narrow AI agents 588, the driving decision unit 590, the prediction unit 1150, the memory management unit 1152, the processing management unit 1153, locations and MDIs statistics 1380, expected local path provider 1381 and path related locations identifier 1382.

According to an embodiment, the at least two of the processing units 1154(1)-1154(K) may differ from each other by at least one parameter out of an amount of computational resources, power consumption, complexity, and the like. The selection of which processing unit to activate provides a tradeoff between the different parameters of the at least two different processing units.

An execution of a perception module may require to provide perception module metadata (such as coefficients of a model of a neural network) and information (such as an information of a domain associated with the perception module) to a processing unit and/or to an associated memory unit (for example an internal memory unit of the processing units or to the second memory unit).

According to an embodiment, the prediction 1151 allows to control the fetching of information and/or perception metadata in an efficient manner—for example by at least one of (a) determining in advance pre-fetch operations that will result in cache hits, (b) determine an allocation of perception modules to processing units that may reduce the amount of configurations of the processing circuits—as it is beneficial to allocate the same processing unit to implement the same perception module during consecutive cycles of operation.

According to an embodiment, the prediction may assist in reducing power consumption of the processing units—by placing processing units not used to idle, by reducing the clock frequency of a processing module that implements any unit that may required to output a result within a few cycles—instead of outputting the result each cycle.

The locations and MDIs statistics 1380 stores information about (a) locations associated with MDI statistics, and (b) the MDI statistics.

The expected local path provider 1381 is configured to provide the expected local path. The expected local path provider 1381 may determine the expected local path in any manner or may receive the expected local path. The expected local path provider 1381 may be a navigation unit, may be an ADAS unit, an AV unit, and the like.

The path related locations identifier 1382 may be configured toe execute step 1330.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for managing a group of narrow artificial intelligence (AI) agents for at least partially autonomous driving, the method comprises:

obtaining, by a prediction circuit, a stream of metadata segments generated at multiple points in time and associated with a selection of one or more sub-groups of the group of narrow AI agents; wherein the metadata segments are selected out of (a) selected narrow AI agent identifiers, and (b) multiple multi-domain identifier, the multiple multi-domain identifier are indicative of multiple instances of multi-domain information about elements affecting a vehicle in relation to the multiple points in time; wherein a multi-domain identifier generated at a given point of time of the multiple points in time is a combination of class signatures that are indicative of classes of elements of a multi-domain information associated with the given point in time;

finding, by the prediction circuit, a segment of the stream that is a predictor to a receiving of a next cluster identifier at a future point in time; and automatically predicting, when finding the predictor, at least one of:

(a) future metadata segments to be received during the future point of time;

(b) a future sub-group of narrow AI agents to be selected at the future point of time.

2. The method according to claim 1, wherein the future sub-group of narrow AI agents is associated with a future sub-group of skills.

3. The method according to claim 1, wherein the automatically predicting triggers a predicting of a next state of the vehicle at the next point of time.

4. The method according to claim 3, comprising triggering a determination of a response to the next state of the vehicle.

5. The method according to claim 3, comprising determining a response to the next state of the vehicle.

6. The method according to claim 1, comprising evaluating an accuracy of the predictor.

7. The method according to claim 1, comprising searching, in at least the stream of metadata segments, for a new predictor.

8. The method according to claim 1, comprising predicting, based on the predictor, selected perception modules out of multiple perception modules, to be utilized during the future point in time.

9. The method according to claim 1, wherein the automatically predicting of the future metadata segments triggers an execution of a driving related operation at a point in time that does not exceed the future point of time.

10. The method according to claim 9, wherein the driving related operation involves changing a speed of the vehicle.

11. The method according to claim 9, wherein the driving related operation involves changing a direction of the vehicle.

12. A non-transitory computer readable medium for managing a group of narrow artificial intelligence (AI) agents for at least partially autonomous driving, the non-transitory computer readable medium stores instructions for:

obtaining, by a prediction circuit, a stream of metadata segments generated at multiple points in time and associated with a selection of one or more sub-groups of the group of narrow AI agents; wherein the metadata segments are selected out of (a) selected narrow AI agent identifiers, and (b) multiple multi-domain identifier, the multiple multi-domain identifier are indicative of multiple instances of multi-domain information about elements affecting a vehicle in relation to the multiple points in time; wherein a multi-domain identifier generated at a given point of time of the multiple points in time is a combination of class signatures that are indicative of classes of elements of a multi-domain information associated with the given point in time;

finding, by the prediction circuit, a segment of the stream that is a predictor to a receiving of a next cluster identifier at a future point in time; and automatically predicting, when finding the predictor, at least one of:

(a) future metadata segments to be received during the future point of time;

(b) a future sub-group of narrow AI agents to be selected at the future point of time.

13. The non-transitory computer readable medium according to claim 12, wherein the future sub-group of narrow AI agents is associated with a future sub-group of skills.

14. The non-transitory computer readable medium according to claim 12, wherein the automatically predicting triggers a predicting of a next state of the vehicle at the next point of time.

15. The non-transitory computer readable medium according to claim 14, comprising triggering a determination of a response to the next state of the vehicle.

16. The non-transitory computer readable medium according to claim 14, comprising determining a response to the next state of the vehicle.

17. The non-transitory computer readable medium according to claim 12, comprising evaluating an accuracy of the predictor.

18. The non-transitory computer readable medium according to claim 12, comprising searching, in at least the stream of metadata segments, for a new predictor.

19. The non-transitory computer readable medium according to claim 12, comprising predicting, based on the predictor, selected perception modules out of multiple perception modules, to be utilized during the future point in time.

20. The non-transitory computer readable medium according to claim 12, wherein the automatically predicting of the future metadata segments triggers an execution of a driving related operation at a point in time that does not exceed the future point of time.

* * * * *